US012769241B2

(12) United States Patent
Matsumoto

(10) Patent No.: US 12,769,241 B2
(45) **Date of Patent: *Oct. 20, 2026**

(54) SHEET CONVEYANCE APPARATUS AND IMAGE FORMING APPARATUS

(71) Applicant: CANON KABUSHIKI KAISHA, Tokyo (JP)

(72) Inventor: So Matsumoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/196,935

(22) Filed: May 2, 2025

(65) Prior Publication Data

US 2025/0258456 A1 Aug. 14, 2025

Related U.S. Application Data

(63) Continuation of application No. 18/459,690, filed on Sep. 1, 2023, now Pat. No. 12,321,122.

(30) Foreign Application Priority Data

Sep. 5, 2022 (JP) ................................ 2022-140907

(51) Int. Cl.

*G03G 15/00* (2006.01)
*B65H 7/10* (2006.01)
*B65H 9/04* (2006.01)

(52) U.S. Cl.

CPC ........... *G03G 15/6567* (2013.01); *B65H 7/10* (2013.01); *B65H 9/04* (2013.01); *B65H 2404/144* (2013.01)

(58) Field of Classification Search

CPC ........ G03G 15/6567; B65H 7/10; B65H 9/04; B65H 2404/144

See application file for complete search history.

(56) References Cited

U.S. PATENT DOCUMENTS 7,628,398 B2 * 12/2009 Elliot ..................... B65H 9/002 271/228
12,321,122 B2 * 6/2025 Matsumoto .............. B65H 9/04
2004/0188929 A1 * 9/2004 Tada ...................... B65H 9/166 271/248

(Continued)

OTHER PUBLICATIONS

Office Action issued in U.S. Appl. No. 18/459,690, mailed Jul. 18, 2024.

(Continued)

*Primary Examiner* — David H Banh
(74) *Attorney, Agent, or Firm* — ROSSI, KIMMS & McDOWELL LLP

(57) ABSTRACT

A sheet conveyance apparatus includes a rotary member pair, a movement portion, a detection portion, an abutment member, an oblique conveyance portion, and a controller configured to, on a basis of a detection result of the detection portion, move the rotary member pair in a width direction by the movement portion such that a position, in the width direction, of the downstream end of the sheet is a set position in a state in which the rotary member pair is nipping the sheet and before the sheet reaches the oblique conveyance portion. The controller is configured to execute a correction mode of correcting the set position.

9 Claims, 25 Drawing Sheets

(56) References Cited

U.S. PATENT DOCUMENTS

| | | | | |
|---|---|---|---|---|
| 2007/0235920 | A1* | 10/2007 | Kawashima | B65H 9/166 271/226 |
| 2013/0113158 | A1* | 5/2013 | Miyazawa | B65H 85/00 271/227 |
| 2018/0117934 | A1* | 5/2018 | Herrmann | B41J 13/26 |
| 2019/0023511 | A1* | 1/2019 | Ishioka | B65H 9/166 |
| 2022/0144571 | A1 | 5/2022 | Iwami et al. | |

OTHER PUBLICATIONS

Notice of Allowance issued in U.S. Appl. No. 18/459,690, mailed Feb. 7, 2025.

Notice of Allowance issued in U.S. Appl. No. 18/459,653 mailed Sep. 30, 2025.

Office Action issued in U.S. Appl. No. 18/459,653 mailed Jun. 6, 2025.

* cited by examiner

SHEET CONVEYANCE APPARATUS AND IMAGE FORMING APPARATUS

BACKGROUND OF THE INVENTION

Field of the Invention

The present invention relates to a sheet conveyance apparatus that conveys a sheet and to an image forming apparatus.

Description of the Related Art

According to Japanese Patent Laid-Open No. H11-189355, an image forming apparatus employing a so-called side registration system in which the skew of a sheet is corrected by obliquely conveying the sheet by an oblique conveyance roller pair and thus causing an end portion of the sheet to abut an abutment member. This side registration system is advantageous as compared with, for example, a system in which the sheet is warped by causing the sheet to abut a roller pair or a shutter that is in a stationary state, in that decrease in the sheet conveyance speed is small, improvement in the productivity is expected, and a sheet difficult to warp such as a cardboard can be also used.

In the side registration system described above, there is a possibility that the sheet conveyance speed varies depending on the time in which the sheet abuts the abutment member or the time in which the sheet is obliquely conveyed by the oblique conveyance roller pair while slipping. Therefore, according to Japanese Patent Laid-Open No. 2022-013356, an image forming apparatus in which an end portion of a conveyed sheet is detected by a position sensor such as a contact image sensor: CIS, a conveyance roller pair on the upstream side in a conveyance direction is moved in a width direction before conveying the sheet to an oblique conveyance roller pair, and thus the position of the sheet in the width direction is corrected is proposed. As a result of this, the distance between the end portion of the sheet conveyed to the oblique conveyance roller pair and the abutment member is stabilized, thus a distance in which the sheet is obliquely conveyed by the oblique conveyance roller pair is stabilized, and the time in which the sheet is obliquely conveyed or the time in which the sheet abuts the abutment member is stabilized. Therefore, the sheet conveyance speed can be stabilized, and occurrence of a sheet jam or the like can be reduced to suppress deterioration of the productivity.

Incidentally, the image forming apparatus described in Japanese Patent Laid-Open No. 2022-013356 shifts the sheet abutting the abutment member in the width direction, and thus aligns the sheet with an image formed in the image forming portion and transferred onto the sheet. However, if the position of the abutment member is not good, the alignment of the position of the shifted sheet with the transferred image is neither good. Therefore, adjustment to improve the alignment between the sheet and the image by adjusting the position of the abutment member is performed in some cases.

However, if the position of the abutment member is moved, the distance between an end portion of the sheet (sheet before skew correction) moved in the width direction by the conveyance roller pair is deviated, and thus the distance by which the sheet is moved in the width direction by an oblique conveyance roller pair is also deviated. Therefore, the sheet conveyance speed varies, which can cause a sheet jam, and thus there is a possibility that the productivity deteriorates.

SUMMARY OF THE INVENTION

According to one aspect of the present invention, a sheet conveyance apparatus includes a rotary member pair configured to nip and convey a sheet in a sheet conveyance direction, a movement portion configured to move the rotary member pair in a width direction orthogonal to the sheet conveyance direction, the width direction including a first direction from a first side toward a second side in the width direction and a second direction opposite to the first direction, a detection portion configured to detect a position of a downstream end, in the first direction, of the sheet, an abutment member disposed downstream of the rotary member pair in the sheet conveyance direction and configured to be positionally adjustable, the abutment member including an abutment surface configured to extend along the sheet conveyance direction, an oblique conveyance portion disposed downstream of the rotary member pair in the sheet conveyance direction and configured to convey the sheet simultaneously in the sheet conveyance direction and the first direction such that the downstream end of the sheet abuts the abutment surface, and a controller configured to, on a basis of a detection result of the detection portion, move the rotary member pair in the width direction by the movement portion such that a position, in the width direction, of the downstream end of the sheet is a set position in a state in which the rotary member pair is nipping the sheet and before the sheet reaches the oblique conveyance portion, the set position being a position away from the abutment surface by a predetermined distance in the second direction. The controller is configured to execute a correction mode of correcting the set position.

Further features of the present invention will become apparent from the following description of exemplary embodiments with reference to the attached drawings.

DESCRIPTION OF THE EMBODIMENTS

First Embodiment

Figure 1:
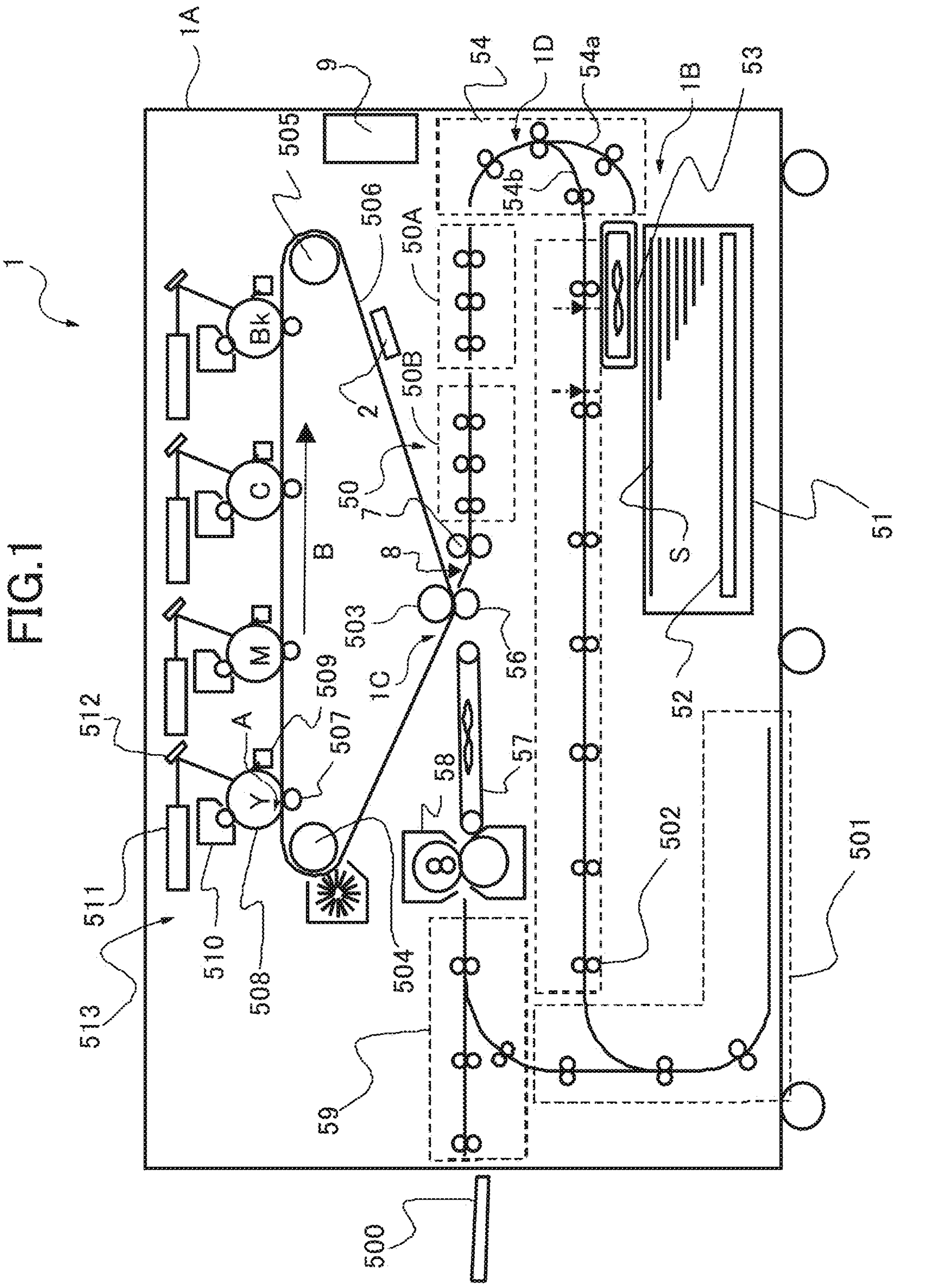
FIG. 1 is a schematic view of a printer according to a first embodiment.

A first embodiment of the present invention will be described below with reference to FIGS. 1 to 19. First, a schematic configuration of a printer 1 serving as an image forming apparatus including a registration unit 50 as a sheet conveyance apparatus according to the first embodiment will be described. FIG. 1 is a schematic view of the image forming apparatus according to the first embodiment. To be noted, in the printer 1, various sheets can be used as recording media. Examples of the various sheets include paper sheets, envelopes, glossy paper sheets, plastic films such as sheets for overhead projectors, and cloths.

Configuration of Image Forming Apparatus

As illustrated in FIG. 1, the printer 1 includes a controller 9 (see FIG. 13) that controls the overall operation of the printer 1 on the basis of image information input from an external personal computer: external PC, or image information read from a document. An apparatus body 1A of the printer 1 houses a feeding cassette 51 accommodating a sheet S, and an image formation engine 513 serving as an image forming portion that forms an image on the sheet S fed from the feeding cassette 51. The image formation engine 513 serving as an example of an image forming portion includes four image formation process portions PY, PM, PC, and PK that respectively form yellow, magenta, cyan, and black toner images, and an intermediate transfer belt 506 serving as an image bearing member. The image formation engine 513 forms an image on the sheet S by a tandem-type intermediate transfer system. The image formation process portions PY to PK are electrophotographic units respectively including photosensitive drums 1Y, 1M, 1C, and 1K serving as photosensitive members.

The image formation process portions PY to PK are configured in the same manner except for the color of toner used for development. Here, the configuration of the image formation engine 513 and an image formation process of a toner image will be described by using the yellow image formation process portion PY as an example. The image formation process portion PY includes an exposing unit 511, a developing unit 510, and a drum cleaner 509 in addition to the photosensitive drum 1Y. The photosensitive drum 1Y is a photosensitive member of a drum shape having a photosensitive layer on the outer circumferential portion thereof, and rotates in a direction following the rotation direction of the intermediate transfer belt 506. The rotation direction of the photosensitive drum 1Y is indicated by an arrow A in FIG. 1, and the rotation direction of the intermediate transfer belt 506 is indicated by an arrow B in FIG. 1. The surface of the photosensitive drum 1Y is charged by being supplied with electric charges from a charging portion such as a charging roller. The exposing unit 511 scans the photosensitive drum 1Y by an optical system including a reflection unit 512 with laser light modulated in accordance with the image information, and thus draws an electrostatic latent image on the surface of the photosensitive drum 1Y. The developing unit 510 accommodates developer including toner, and supplies the toner to the photosensitive drum 1Y to visualize the electrostatic latent image as a toner image.

The toner image formed on the photosensitive drum 1Y is transferred onto the intermediate transfer belt 506 through primary transfer in a primary transfer portion that is a nip portion between a primary transfer roller 507 and the intermediate transfer belt 506. Residual toner remaining on the photosensitive drum 1Y after the transfer is removed by the drum cleaner 509.

The intermediate transfer belt 506 is looped over a driving roller 504, a driven roller 505, a secondary transfer inner roller 503, and the primary transfer roller 507, and is rotationally driven in a clockwise direction indicated by the arrow B in FIG. 1 by the driving roller 504. The image formation process described above is performed in parallel in each of the image formation process portions PY to PK, toner images of four colors are transferred so as to be superimposed on each other, and thus a full-color toner image is formed on the intermediate transfer belt 506. This toner image is conveyed to a secondary transfer portion 1C in the state of being borne on the intermediate transfer belt 506. The secondary transfer portion 1C is configured as a nip portion between a secondary transfer roller 56 serving as a transfer roller and the secondary transfer inner roller 503. A bias voltage of a polarity opposite to the charging polarity of the toner is applied to the secondary transfer roller 56, and thus the toner image is transferred onto the sheet S through secondary transfer. Residual toner remaining on the intermediate transfer belt 506 after the transfer is removed by a belt cleaner 508.

The sheet S onto which the toner image has been transferred is passed onto a fixing unit 58 by a pre-fixation conveyance portion 57. The fixing unit 58 includes a fixing roller pair that nips and conveys the sheet S, and a heat source such as a halogen heater, and applies pressure and heat to the toner image borne on the sheet S. As a result of this, the toner particles melt and adhere to the sheet S, and thus the toner image is fixed to the sheet S.

Next, a sheet conveyance process of conveying a sheet will be described. A sheet conveyance system 1D of the printer 1 conveys the sheet S fed from a sheet feeding unit 1B serving as a sheet feeding apparatus, and discharges the sheet S on which an image has been formed to the outside of the apparatus body 1A. The sheet conveyance system 1D includes a sheet conveyance portion 54, a registration unit 50, a pre-fixation conveyance portion 57, a branch conveyance portion 59, a reverse conveyance portion 501, and a duplex conveyance portion 502.

The feeding cassette 51 provided in the sheet feeding unit 1B is removably attached to the apparatus body 1A, and sheets S are accommodated therein in the state of being supported on a lifting/lowering tray 52 capable of ascending and descending and are fed one by one by the sheet feeding portion 53. As the sheet feeding portion 53, a belt system in which the sheet S is attracted to a belt member by a suction fan, a friction separation system using a roller or a pad, or the like can be mentioned. The sheet S delivered out from the sheet feeding portion 53 is conveyed along a feeding path 54*a* by conveyance roller pairs of the sheet conveyance portion 54, and is passed onto the registration unit 50.

The sheet S passed onto the registration unit 50 is conveyed toward the secondary transfer portion 1C after being subjected to skew correction and timing correction. At this time, a registration roller pair 7 of the registration unit 50 sends the sheet S into the secondary transfer portion 1C in accordance with the progress of the image formation process by the image formation process portions PY to PK on the basis of detection of the sheet by a sheet detection sensor 8. The sheet S onto which the toner image has been transferred in the secondary transfer portion 1C and to which the toner image has been fixed by the fixing unit 58 is conveyed to the branch conveyance portion 59 where the conveyance path of the sheet S branches. In the case where image formation on the sheet S has been completed, the sheet S is discharged by a discharge roller pair onto a discharge tray 500 disposed on the outside of the apparatus body 1A.

In contrast, in the case of forming an image on the back surface of the sheet S, the sheet S is passed onto the duplex conveyance portion 502 via the reverse conveyance portion 501. The reverse conveyance portion 501 includes a reverse conveyance roller pairs capable of rotating in a normal direction and a reverse direction, and reverses the sheet by a switch back method of flipping the surfaces of the sheet S. That is, after the leading end of the sheet S is retracted, the reverse conveyance portion 501 reverses the conveyance direction to flip the surfaces of the sheet S, and then passes the sheet S onto the duplex conveyance portion 502. The duplex conveyance portion 502 conveys the sheet S again toward the registration unit 50 via a feeding path 54*b* of the sheet conveyance portion 54. Then, an image is formed on the back surface of the sheet S, and the sheet S is discharged onto the discharge tray 500.

Configuration of Registration Unit

Figure 2:
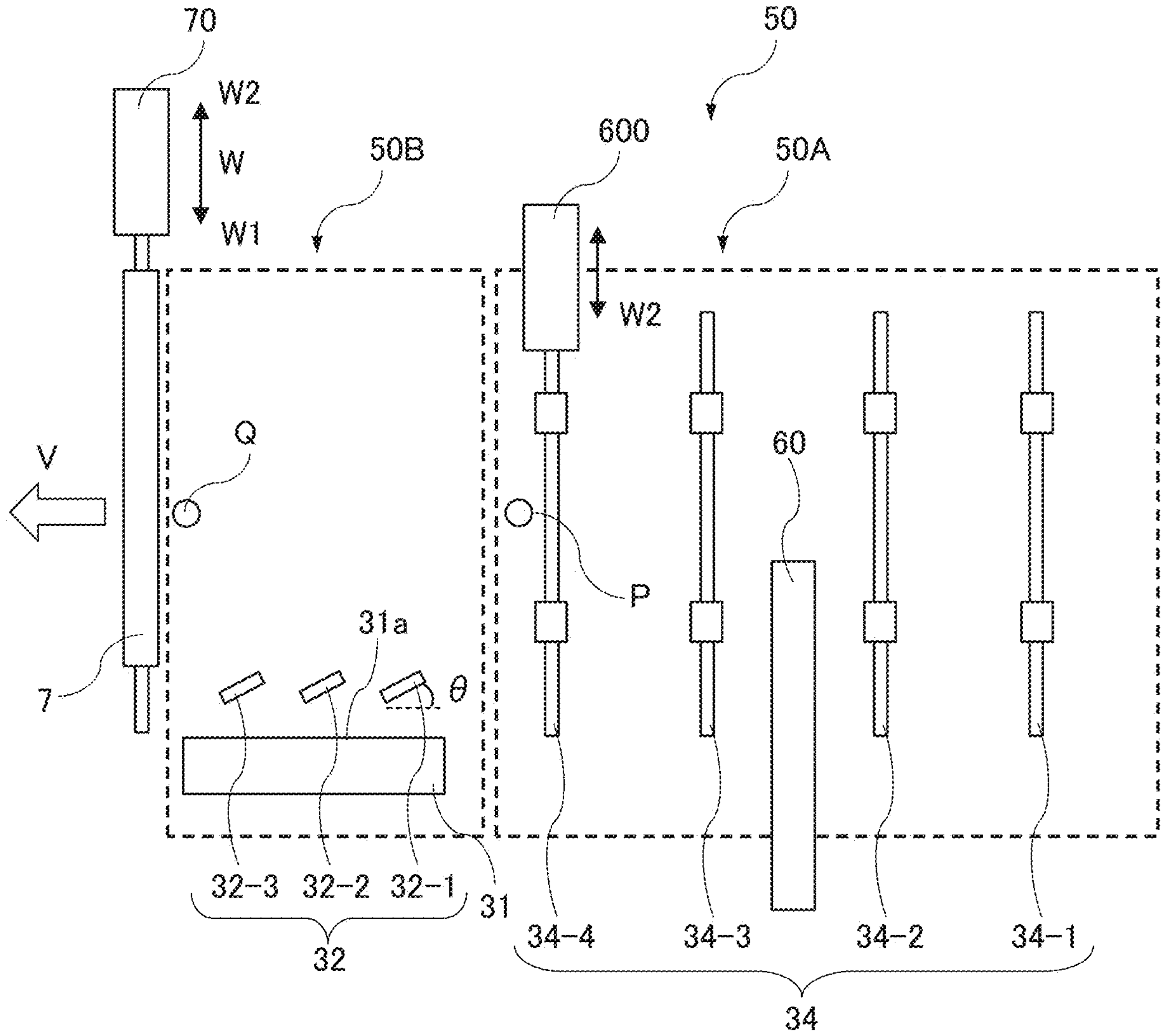
FIG. 2 is a top view of a registration unit according to the first embodiment.

Next, the configuration of the registration unit 50 constituting the sheet conveyance apparatus will be descried with reference to FIG. 2. FIG. 2 is a top view of the registration unit 50. To be noted, the registration unit 50 according to the present embodiment is a unit that corrects the skew of the sheet by a side registration method.

Specifically, as illustrated in FIG. 2, the registration unit 50 includes a conveyance portion 50A, a skew correction portion 50B, and a registration roller pair 7 in this order from the upstream side toward the downstream side in the sheet conveyance direction. In addition, the registration unit 50 includes a sheet position detection sensor 60 serving as a detection portion or a first detection portion that detects the position of an end portion of the sheet in a width direction W orthogonal to the sheet conveyance direction. Further, the registration unit 50 includes a slide mechanism 600 that moves one of the conveyance roller pairs of the conveyance portion 50A in the width direction W. To be noted, the width direction W includes a first direction W1 from a first side toward a second side in the width direction W, and a second direction W2 opposite to the first direction W1. The conveyance portion 50A includes at least one conveyance roller pair that conveys the sheet in the sheet conveyance direction, and FIG. 2 illustrates a configuration in which conveyance roller pairs 34-1, 34-2, 34-3, and 34-4 are provided. In the description below, in the case where the conveyance roller pairs 34-1 to 34-4 do not need to be distinguished from each other, the conveyance roller pairs 34-1 to 34-4 will be referred to as "conveyance roller pairs 34".

To be noted, in the registration unit 50 of the present embodiment, the slide mechanism 600 serving as a movement portion or a first movement portion is provided to the conveyance roller pair 34-4 serving as a rotary member pair or a first rotary member pair. In addition, FIG. 2 illustrates a configuration in which the sheet position detection sensor 60 is disposed between the conveyance roller pair 34-2 and the conveyance roller pair 34-3 as an example. The sheet position detection sensor 60 may be disposed in a position other than the position illustrated in FIG. 2 as long as an end portion in the width direction W of the sheet conveyed in the conveyance portion 50A can be detected. For example, the sheet position detection sensor 60 can be disposed between the conveyance roller pair 34-4 and the conveyance roller pair 34-3.

The skew correction portion 50B includes oblique conveyance roller pairs 32-1, 32-2, and 32-3 serving as oblique conveyance portions, and a standard member 31 serving as an abutment member. In the description below, in the case where the oblique conveyance roller pairs 32-1, 32-2, and 32-3 do not need to be distinguished from each other, the oblique conveyance roller pairs 32-1, 32-2, and 32-3 will be referred to as "oblique conveyance roller pairs 32". The standard member 31 includes a standard surface 31*a* extending in a sheet conveyance direction V, and is disposed on one side in the width direction W. The standard surface 31*a* serving as an abutment surface is an abutment surface which extends in the sheet conveyance direction V and which one end (side end) portion of the sheet in the width direction W can abut.

In the vicinity of the conveyance roller pair 34-4, a pre-registration sensor P that detects arrival of the leading end of the sheet by detecting the presence or absence of the sheet is disposed. As the pre-registration sensor P, for example, a photoelectric sensor of a reflection type including a light emitting portion and a light receiving portion can be used. In this case, light emitted from the light emitting portion is reflected by the sheet having reached the detection position, the light receiving portion detects the reflected light, and thus the passage timing of the sheet is detected. As illustrated in FIG. 2, in the present embodiment, the pre-registration sensor P is disposed between the conveyance roller pair 34-1 and the oblique conveyance roller pair 32-1 in the sheet conveyance direction V.

The oblique conveyance roller pairs 32-1, 32-2, and 32-3 each rotate about an axis inclined with respect to the width direction W. That is, the oblique conveyance roller pairs 32-1, 32-2, and 32-3 are arranged parallel to each other such that a tangential direction thereof at a contact portion with a sheet is inclined by an angle α with respect to the sheet conveyance direction V. Therefore, the oblique conveyance roller pairs 32-1, 32-2, and 32-3 rotate in contact with the sheet, and thus moves the sheet such that the sheet becomes closer to the standard surface 31*a* of the standard member 31 in the width direction W as the sheet moves downstream in the sheet conveyance direction V. In addition, the sheet is moved by the oblique conveyance roller pairs 32 such that the sheet becomes closer to the standard surface 31*a* of the standard member 31 in the width direction W as the sheet moves downstream in the sheet conveyance direction V.

Here, the skew correction of the sheet by the skew correction portion 50B will be described. The skew correction portion 50B corrects the skew of the sheet by a so-called side registration method. Specifically, the skew correction portion 50B causes a side end of the sheet in the width direction W to abut the standard member 31 having the standard surface 31*a* extending along the sheet conveyance direction V. Then, after the sheet is caused to abut the standard surface 31*a*, the side end of the sheet is moved along the standard surface 31*a* to correct the skew of the sheet. To be noted, the sheet conveyance direction Vis the movement direction of the sheet before the sheet approaches the standard member 31 in the skew correction portion 50B, and refers to the sheet conveyance direction V of the conveyance roller pairs 34 of the conveyance portion 50A in the present embodiment.

In addition, in the skew correction portion 50B, a pre-registration roller sensor Q serving as a second detection portion that detects arrival of the leading end of the sheet by detecting the presence or absence of the sheet is provided in addition to the pre-registration sensor P. The pre-registration roller sensor Q is disposed at a position downstream of the oblique conveyance roller pairs 32 and upstream of the registration roller pair 7 in the sheet conveyance direction V. Similarly to the pre-registration sensor P, a photoelectric sensor of a reflection type or the like can be used as the pre-registration roller sensor Q. In addition, the pre-registration roller sensor Q is a sensor for detecting the sheet reaching the registration roller pair 7. Specifically, the sheet is detected as having reached the registration roller pair 7 in response to the elapse of a predetermined delay time since detection of the sheet by the pre-registration roller sensor Q. However, the function of the pre-registration roller sensor Q can be said to detect the fact that the sheet will reach the registration roller pair 7. To be noted, the pre-registration roller sensor Q may be disposed downstream of the registration roller pair 7, and in this case, the pre-registration roller sensor Q detects the fact that the sheet has already reached the registration roller pair 7.

The registration roller pair 7 serving as a second rotary member pair is capable of moving the sheet by the slide mechanism 70 serving as a second movement portion by sliding the sheet in the width direction W while nipping the sheet. To be noted, as the slide mechanism 70, a similar mechanism to the slide mechanism 600 that moves the conveyance roller pair 34-4 in the width direction W can be used. In addition, the registration roller pair 7 moves the sheet whose side end is abutting the standard surface 31*a* of the standard member 31 in the width direction W in accordance with the position of the image to be transferred thereto in the secondary transfer portion 1C. As a result of this, the center in the width direction W of the sheet whose skew has been corrected in the registration unit 50 moves such that the center coincides with the center in the width direction W of the image to be transferred in the secondary transfer portion 1C, that is, the center in the width direction W of an image forming region. In addition, the method for adjusting the positions of the sheet and the image to be formed on the sheet is not limited to this. For example, the adjustment may be performed such that the center of the sheet is moved by the registration roller pair 7 so as to coincide with the conveyance center of the printer 1, and the center of the positions of the toner images formed by the image formation process portions PY to PK in the main scanning direction coincides with the center in the width direction W.

Detailed Configuration of Conveyance Portion

Figure 3A:
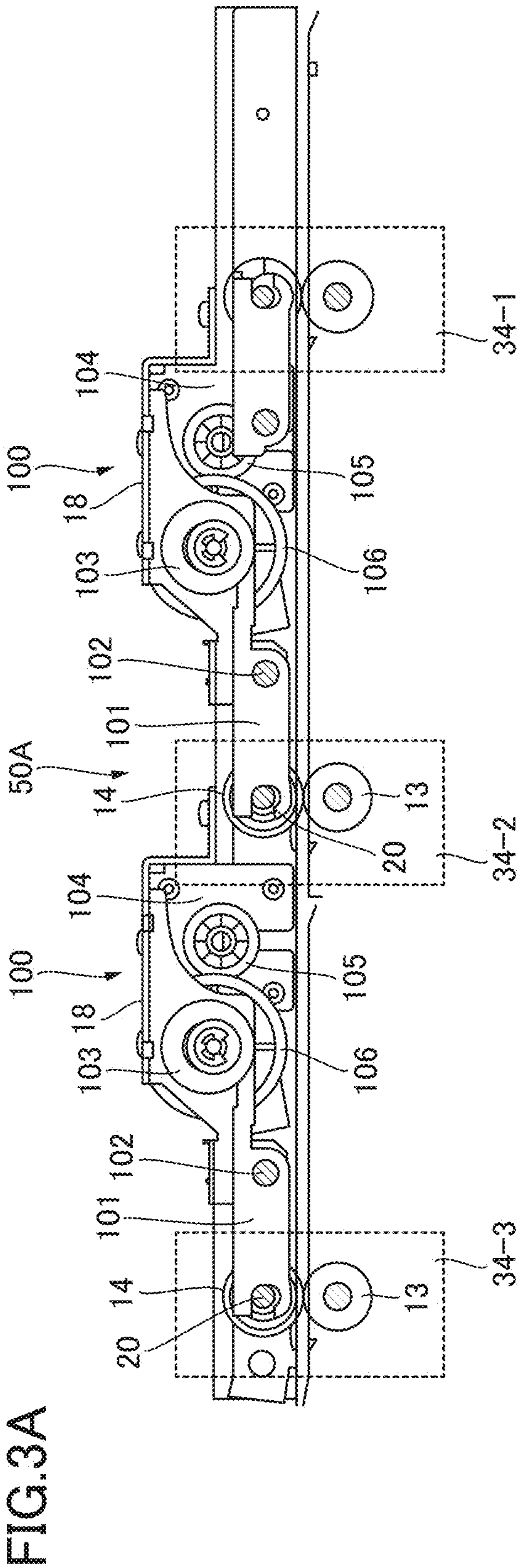
FIG. 3A is a section view of a conveyance portion of the registration unit in a nip-conveyance state.
Figure 3B:
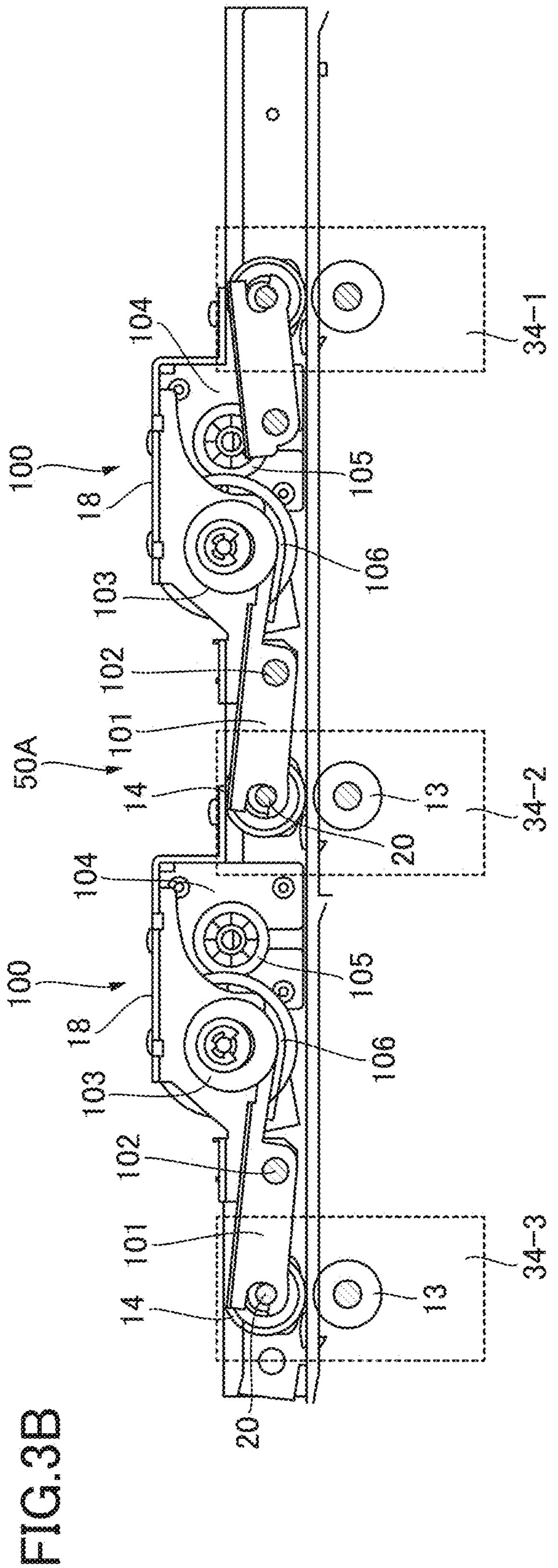
FIG. 3B is a section view of the conveyance portion of the registration unit in a non-nipping state.
Figure 4:
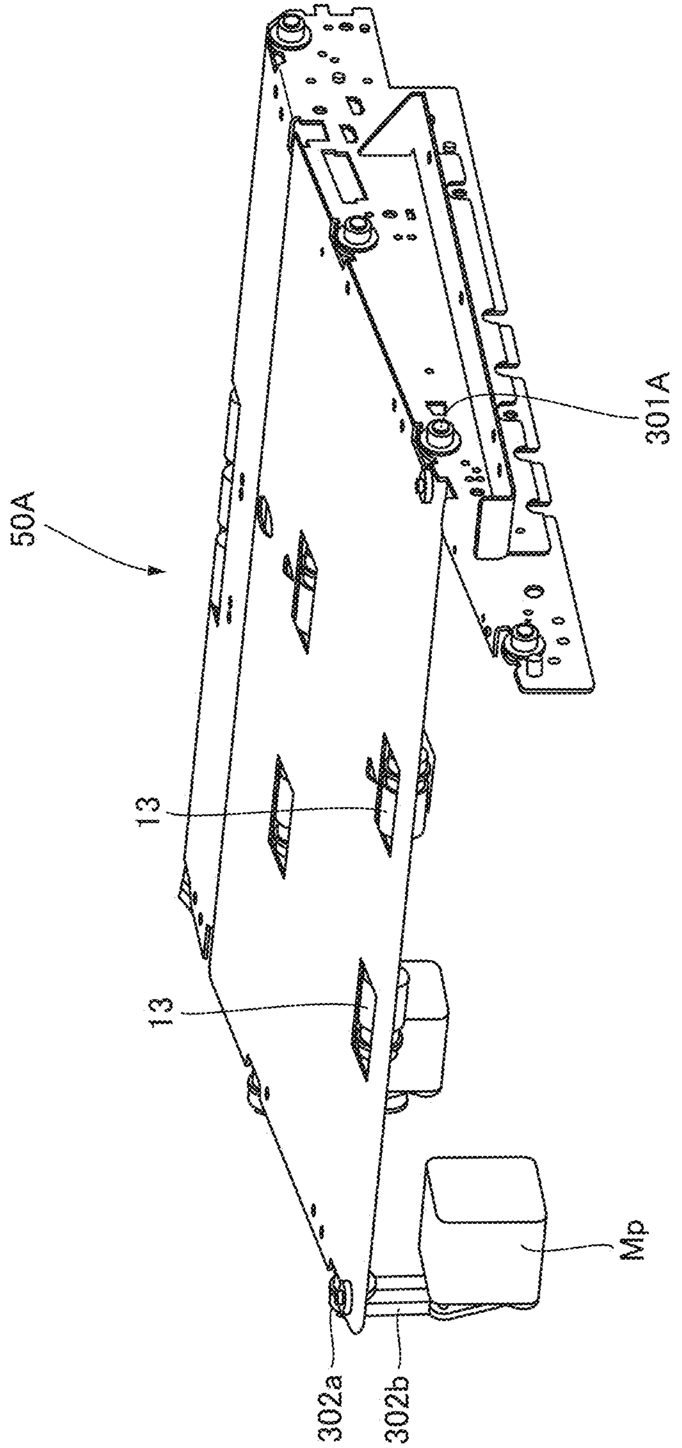
FIG. 4 is a perspective view of part of the conveyance portion of the registration unit.

A detailed configuration of the conveyance portion 50A will be described in detail with reference to FIGS. 3A, 3B, and 4. FIG. 3A is a section view of the conveyance portion 50A in the registration unit 50 in a nip-conveyance state. FIG. 3B is a section view of the conveyance portion 50A in the registration unit 50 in a non-nipping state. FIG. 4 is a perspective view of part of the conveyance portion 50A in the registration unit 50. To be noted, FIGS. 3A and 3B each illustrate three of the four conveyance roller pairs 34. In addition, in the present embodiment, although a case where the printer 1 includes the four conveyance roller pairs 34 as illustrated in FIG. 2 is described as an example, the number of the conveyance roller pairs is not limited to this.

As illustrated in FIGS. 3A and 3B, in the conveyance portion 50A, the conveyance roller pairs 34-1, 34-2, and 34-3 are each constituted by a driving roller 13 to which a driving force is input, and a driven roller 14 that is rotated by the driving roller 13. The conveyance roller pairs 34 are capable of switching between the nip-conveyance state illustrated in FIG. 3B in which the conveyance roller pairs

34 are capable of nipping and conveying a sheet in a nip portion, and a non-nipping state illustrated in FIG. 3B in which the nip portion is separated and the sheet is not nipped. To be noted, whether or not to make all the conveyance roller pairs 34 switchable between the nip-conveyance state and the non-nipping state can be determined in accordance with the maximum size of the sheet that can be conveyed by the printer 1.

The conveyance portion 50A includes, as a switching portion capable of switching the conveyance roller pairs 34-1, 34-2, and 34-3 between the nip-conveyance state and the non-nipping state, cam mechanisms 100 each including an eccentric roller 103. The eccentric roller 103 is rotationally driven by a conveyance roller driving motor Md serving as a drive source via gears 105 and 106, and swings an arm member 101 abutting a cam surface of the outer peripheral portion thereof. The arm member 101 is swingably supported about a swing shaft 102 with respect to a stay member 18, abuts the eccentric roller 103 on one side of the swing shaft 102, and supports a driven shaft 20 serving as a rotation shaft of the driven roller 14 on the other side. As a result of the swing of the arm members 101, the driven rollers 14 each appear in the sheet conveyance path formed by an unillustrated guide member. Therefore, by controlling the rotation angle of the eccentric rollers 103 via the conveyance roller driving motor Md that is a stepping motor, the positional relationship between the driven rollers 14 and the driving rollers 13 can be switched. That is, by controlling the rotation angle of the eccentric rollers 103, the non-nipping state in which the driven rollers 14 are separated from the driving rollers 13 and the nip-conveyance state in which the driven rollers 14 are in pressure contact with the driving rollers 13 can be switched.

In addition, as illustrated in FIG. 4, the driving rollers 13 are each a rubber roller attached to a driving roller shaft 301A, and is connected to a conveyance roller driving motor Mp serving as a drive source via a belt transmission mechanism 302. The conveyance roller driving motor Mp is a stepping motor, and is configured to be capable of changing the start and stop timings of the driving and the driving speed, that is, the peripheral speed of the driving rollers 13.

Detailed Configuration of Skew Correction Portion

Figure 5A:
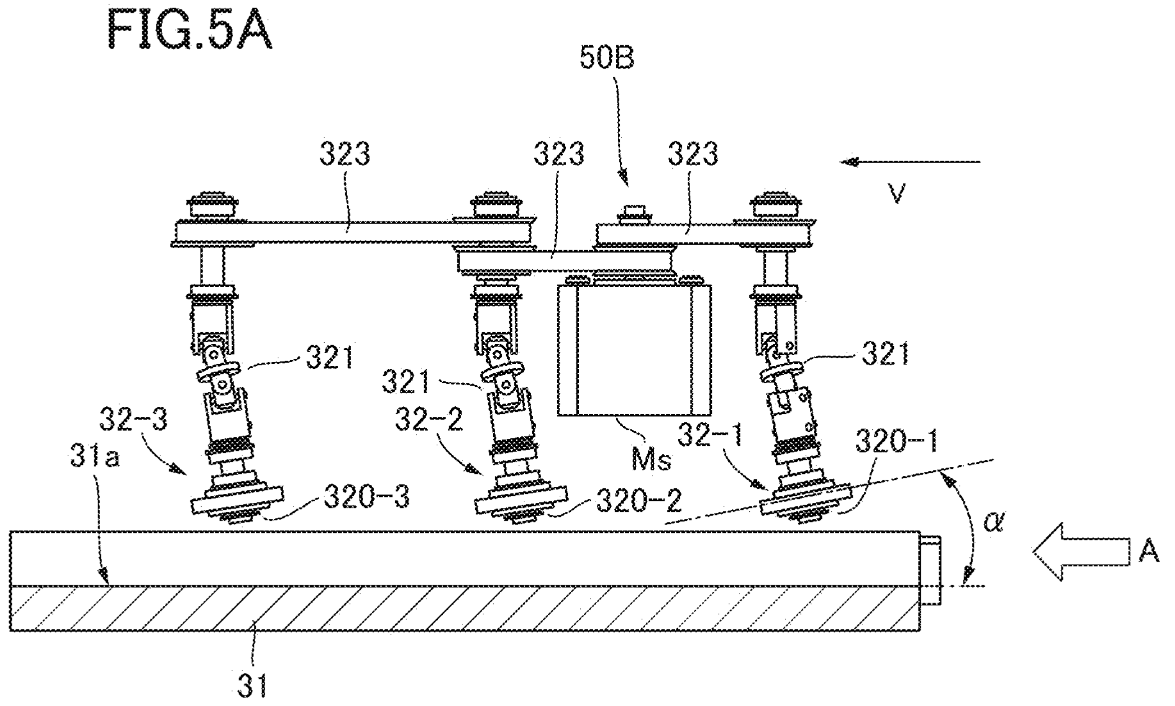
FIG. 5A is a top view of part of a skew correction portion of the registration unit.
Figure 5B:
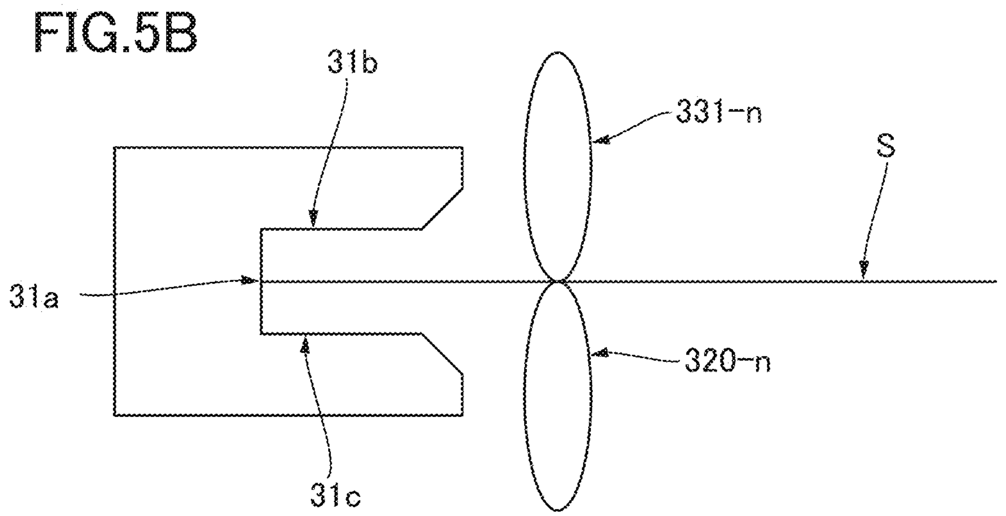
FIG. 5B is a section view of part of the skew correction portion of the registration unit as viewed in a sheet conveyance direction.
Figure 6A:
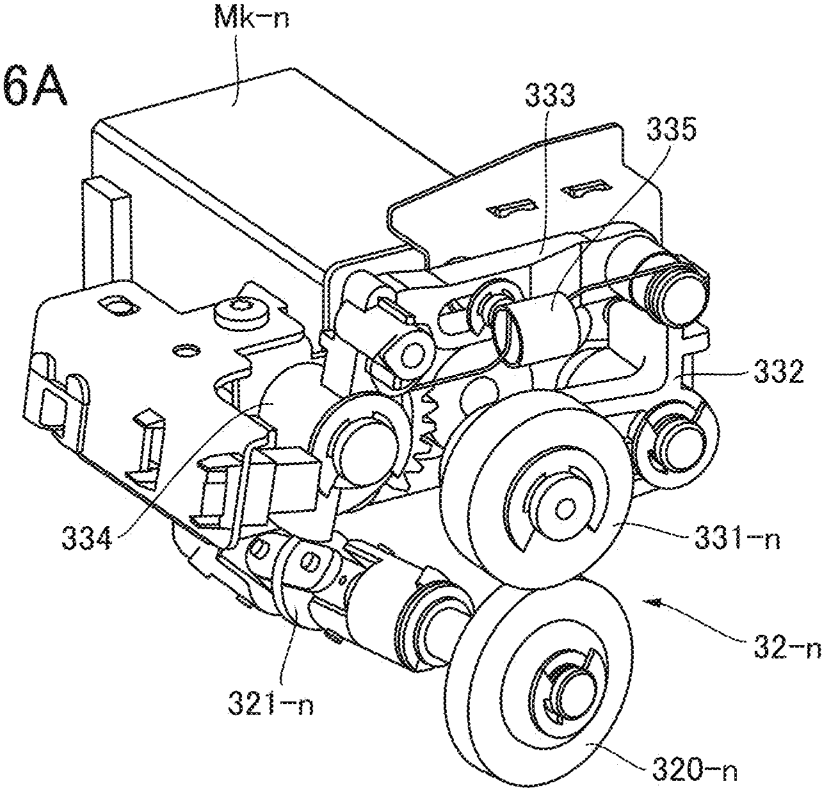
FIG. 6A is a perspective view of an oblique conveyance roller pair and a pressurizing mechanism thereof.
Figure 6B:
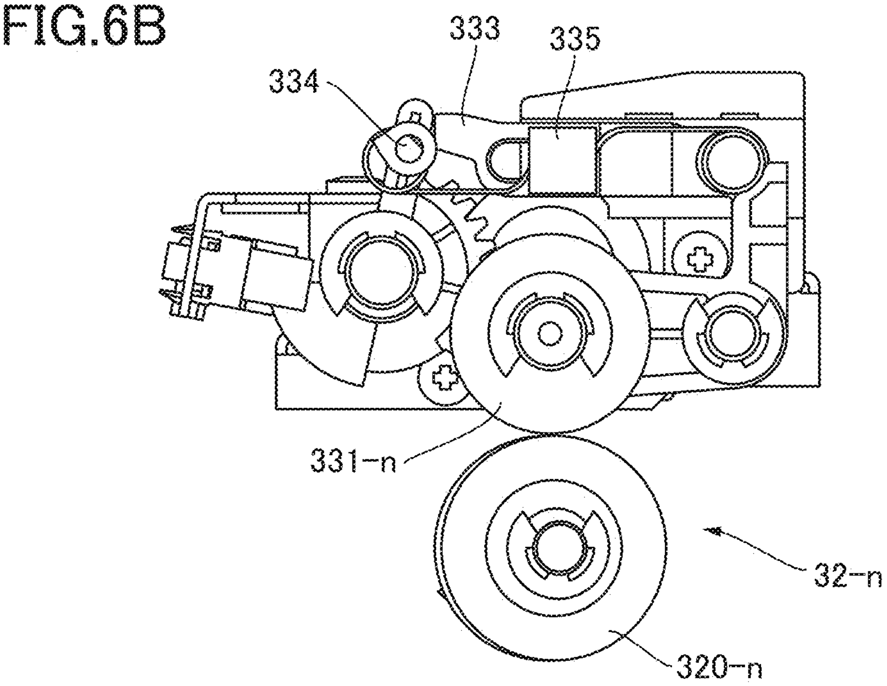
FIG. 6B is a side view of the oblique conveyance roller pair and the pressurizing mechanism thereof.
Figure 7A:
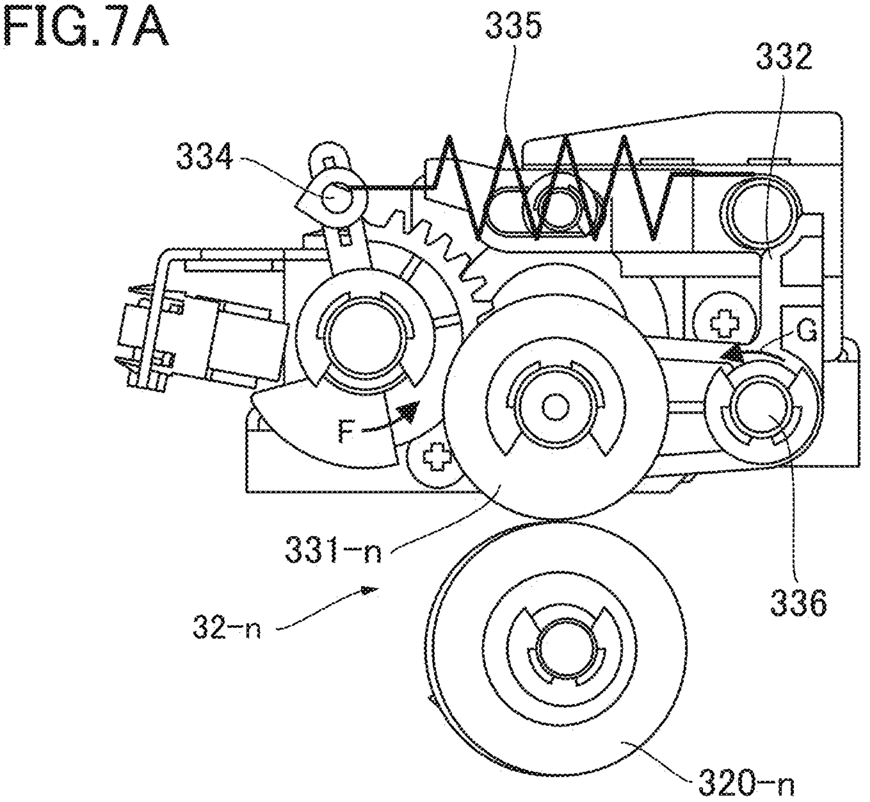
FIG. 7A is a side view of the oblique conveyance roller pair in the nip-conveyance state.
Figure 7B:
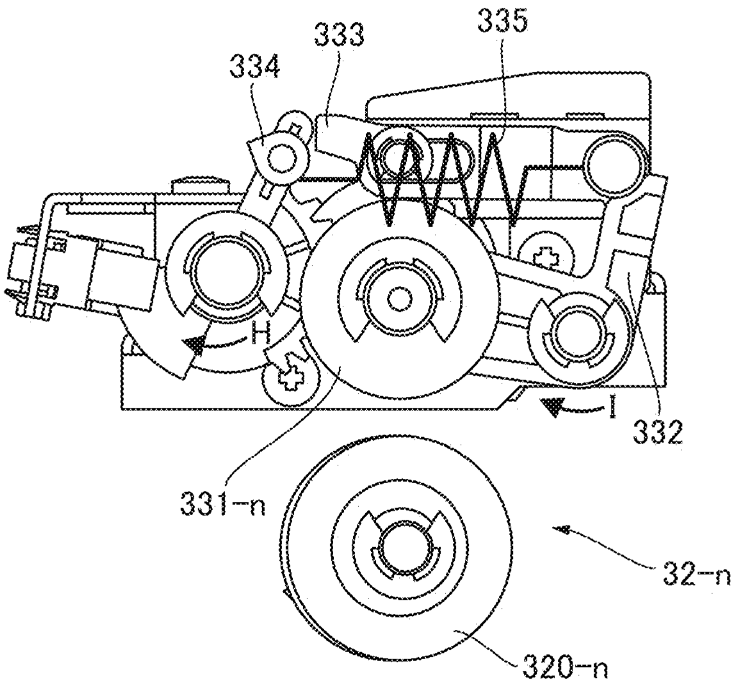
FIG. 7B is a side view of the oblique conveyance roller pair in the non-nipping state.

Next, the configuration of the skew correction portion 50B will be described in detail with reference to FIGS. 5A to 7B. FIG. 5A is a top view of part of the skew correction portion 50B in the registration unit 50. FIG. 5B is a section view part of the skew correction portion 50B in the registration unit 50 as viewed in the sheet conveyance direction V. FIG. 6A is a perspective view of an oblique conveyance roller pair and a pressurizing mechanism thereof. FIG. 6B is a side view of part of the oblique conveyance roller pair and pressurizing mechanism thereof. FIG. 7A is a side view of the oblique conveyance roller pair in the nip-conveyance state. FIG. 7B is a side view of the oblique conveyance roller pair in the non-nipping state.

As illustrated in FIG. 5A, the skew correction portion 50B includes oblique conveyance roller pairs 32-1, 32-2, and 32-3, and the oblique conveyance roller pairs 32-1, 32-2, and 32-3 respectively include driving rollers 320-1, 320-2, and 320-3. The rotation axis of each of the driving rollers 320-1, 320-2, and 320-3 is fixed by a universal joint 321 in the state of being inclined in accordance with an angle $\alpha$. To be noted, in the case where the driving rollers 320-1, 320-2, and 330-3 do not need to be distinguished from each other, these driving rollers will be each referred to as a driving roller 320-*n*.

Each driving roller 320-*n* is connected to a correction roller driving motor Ms serving as a drive source via a transmission mechanism including the universal joint 321, a belt 323, and a pulley. The correction roller driving motor Ms is a stepping motor, and is capable of controlling the driving speed and the driving start/stop timing of the driving roller 320-*n*.

As illustrated in FIG. 5B, the standard member 31 has a recessed cross-section defined by the standard surface 31*a* that a side end of the sheet S abuts, an upper opposing surface 31*b* opposing the upper surface of the sheet S, and a lower opposing surface 31*c* opposing the lower surface of the sheet S. The standard member 31 is formed by die-casting aluminum, and one obtained by forming the standard surface 31*a* with high precision by cutting and further forming fluorine resin such as polytetrafluoroethylene: PTFE on the standard surface 31*a* by the electroless nickel process can be preferably used. In this manner, the standard surface 31*a* having high flatness and high slidability, that is, a low frictional resistance on the sheet can be obtained, thus the precision of the skew correction of the sheet S can be improved.

As illustrated in FIGS. 6A to 7B, the oblique conveyance roller pairs 32-*n* disposed in the skew correction portion 50B each include a driving roller 320-*n* and a driven roller 331-*n* opposing the driving roller 320-*n*. In addition, the skew correction portion 50B includes pressurizing mechanisms 33 that move the driven rollers 331-*n*. The pressurizing mechanisms 33 press the driven rollers 331-*n* against the driving rollers 320-*n* to form nips, and are thus capable of switching the nip-conveyance state in which the sheet can be nipped and conveyed and the non-nipping state in which the driven rollers 331-*n* are separated from the driving rollers 320-*n*.

To be noted, the nip-conveyance state of the pressurizing mechanisms 33 indicates that at least one of the oblique conveyance roller pairs 32 is in the nip-conveyance state, and the non-nipping state of the pressurizing mechanisms 33 indicates that all the oblique conveyance roller pairs 32 are in the non-nipping state. In addition, here, n represents the number given to the oblique conveyance roller pairs 32 and the driven rollers 331 in order from the upstream side to the downstream side in the sheet conveyance direction V, and for example, the oblique conveyance roller pair 32-1 represents the oblique conveyance roller pair 32 that is provided at the most upstream position (n=1). That is, in the skew correction portion 50B of the present embodiment, a plurality of pairs of the driven roller 331-*n* and the pressurizing mechanism 33 are provided in a state in which the oblique conveyance roller pair 32-*n* illustrated in FIGS. 6A to 7B are replaced by one of the oblique conveyance roller pairs 32-1, 32-2, and 32-3.

The pressurizing mechanisms 33 each include an arm member 332, a link member 333, a pressurizing gear 334, a pressurizing spring 335, and a driven roller pressurizing motor Mk-n. The driven roller 331-*n* is supported by the arm member 332 to be rotatable about a swing shaft, and is movable in a direction to move closer to or away from the driving roller 320-*n* by the swing of the arm member 332. The driven roller 331-*n* of the present embodiment rotates along the sheet conveyance direction V about an axis extending in the width direction W, but may be disposed on an axis parallel to the driving roller 320-*n* corresponding thereto. The arm member 332 is coupled to the pressurizing gear 334 via the pressurizing spring 335 and the link member 333. The pressurizing gear 334 is coupled to an output shaft of the driven roller pressurizing motor Mk-n serving as a drive source.

As illustrated in FIG. 7A, in the nip-conveyance state, the pressurizing gear 334 pivots in the counterclockwise direction in FIG. 7A, and the arm member 332 pulled by the pressurizing spring 335 swings in the counter clockwise direction about the swing shaft 332-1. As a result of this, the driven roller 331-*n* comes into pressure contact with the driving roller 320-*n*. In contrast, as illustrated in FIG. 7B, in the non-nipping state, the pressurizing gear 334 pivots in the clockwise direction to press the link member 333, and the link member 333 swings the arm member 332 in the clockwise direction. As a result of this, the driven roller 331-*n* is separated from the driving roller 320-*n*.

The driven roller pressurizing motor Mk-n is a stepping motor, and is capable of changing the expansion amount of the pressurizing spring 335 in a pressurizing state by controlling the rotation angle of the pressurizing gear 334. That is, the pressurizing mechanisms 33 of the present embodiment can switch the nip-conveyance state and the non-nipping state, and change the pressurizing force in the nip-conveyance state.

Configuration of Sheet Position Detection Sensor

Figure 8:
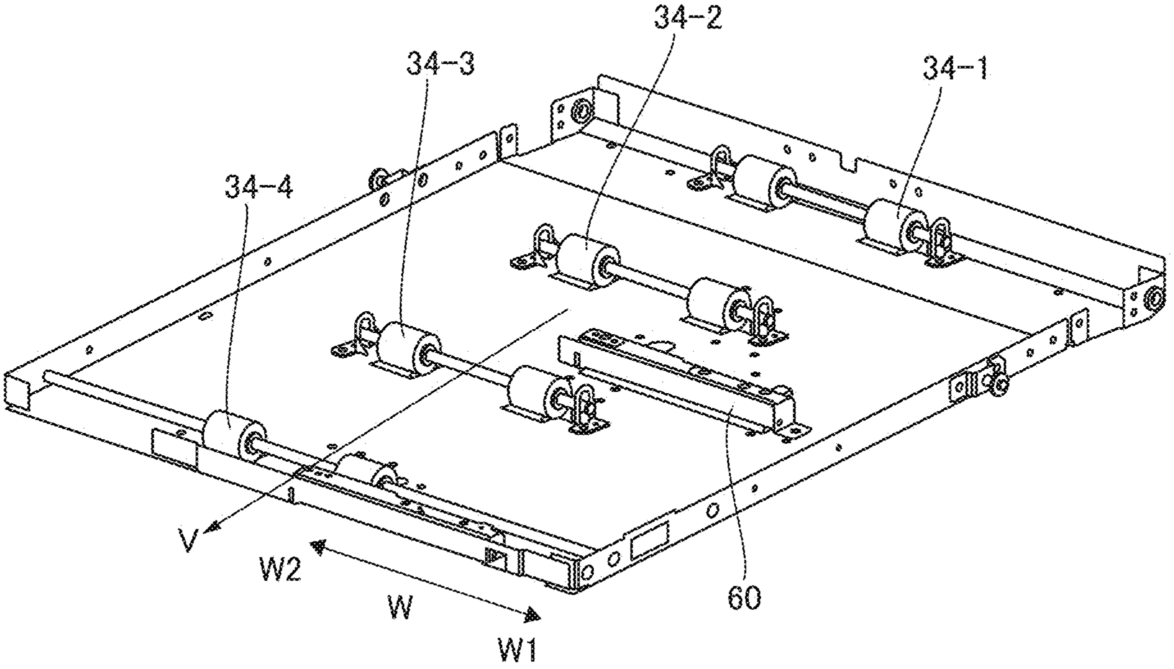
FIG. 8 is a perspective view of a sheet position detection sensor in the conveyance portion of the registration unit.

Next, a configuration of the sheet position detection sensor 60 serving as a detection portion or first detection portion of the present embodiment will be described with reference to FIG. 8. FIG. 8 is a perspective view of the sheet position detection sensor 60 in the conveyance portion 50A of the registration unit 50. The sheet position detection sensor 60 includes an optical element such as a contact image sensor: CIS, and is disposed at a position closer to the standard member 31 in the width direction W with respect to the center in the width direction W of the sheet conveyed in the sheet conveyance direction V. This configuration is employed for detecting the position of the end portion of the sheet that abuts the standard member 31.

Driving and Sliding Configurations of Conveyance Roller Pair

Figure 9:
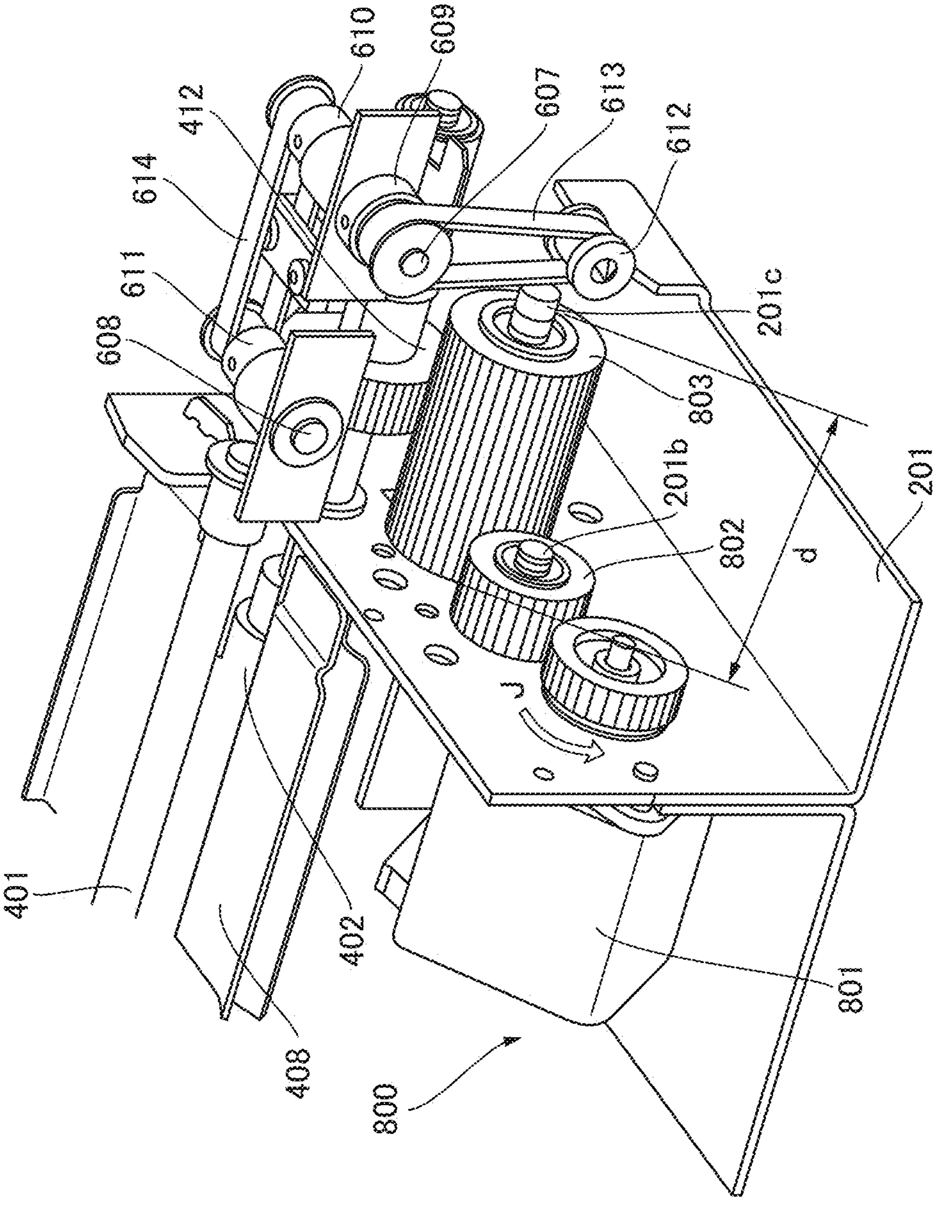
FIG. 9 is a perspective view of a driving mechanism of a conveyance roller pair in the conveyance portion of the registration unit.
Figure 10:
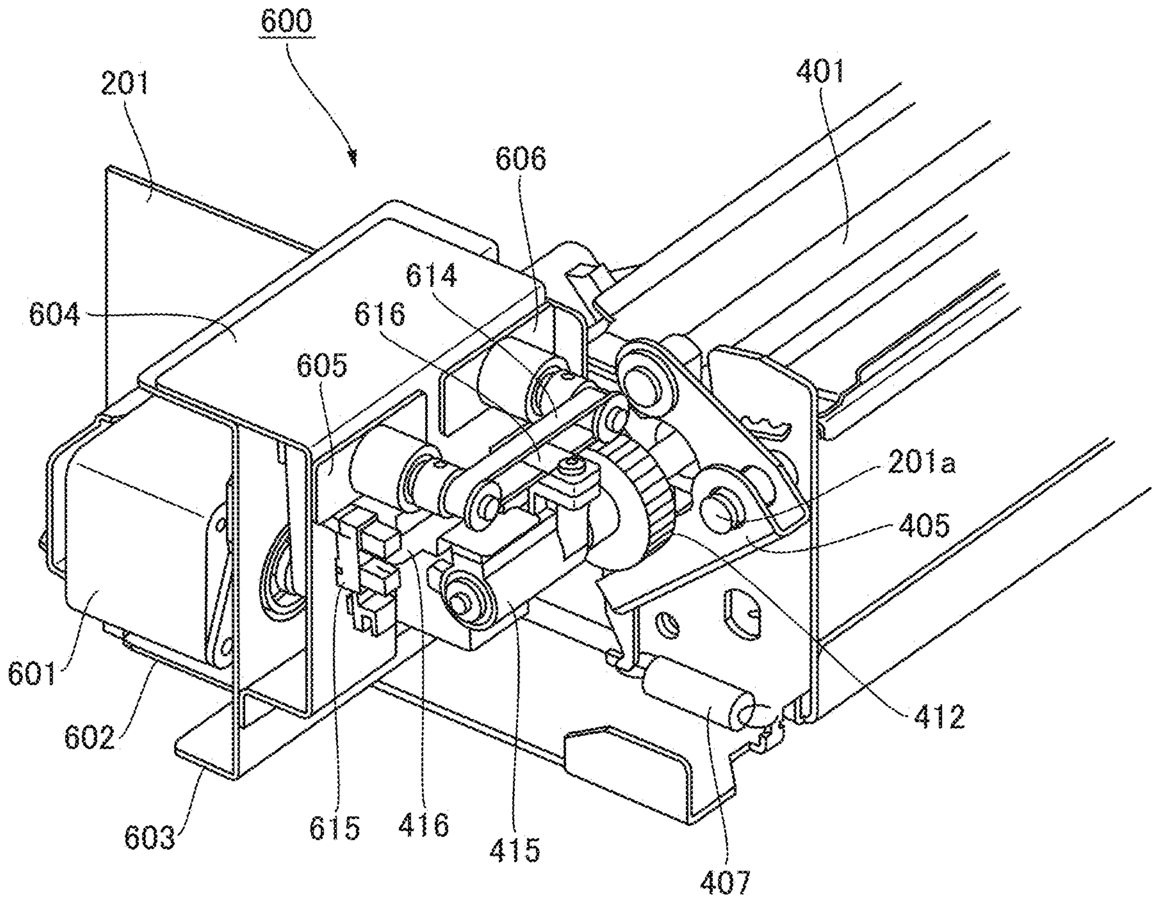
FIG. 10 is a perspective view of a slide mechanism of the conveyance roller pair in the conveyance portion of the registration unit.
Figure 11A:
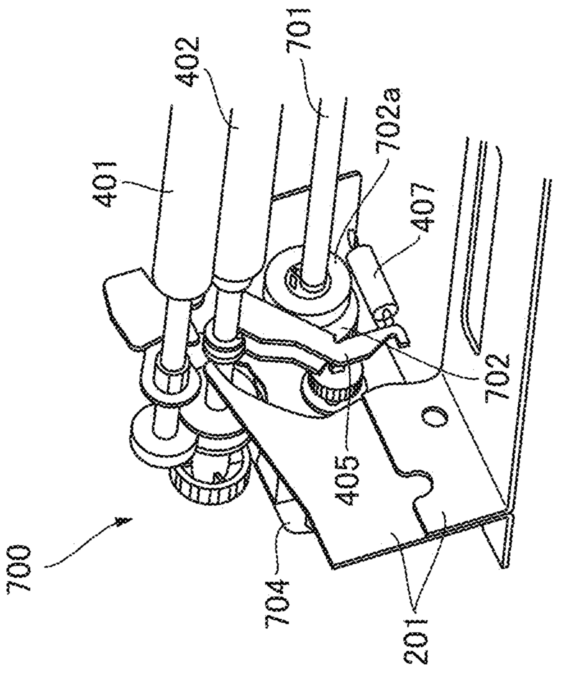
FIG. 11A is a perspective view of a pressure cancellation mechanism of the conveyance roller pair in the conveyance portion of the registration unit.
Figure 11B:
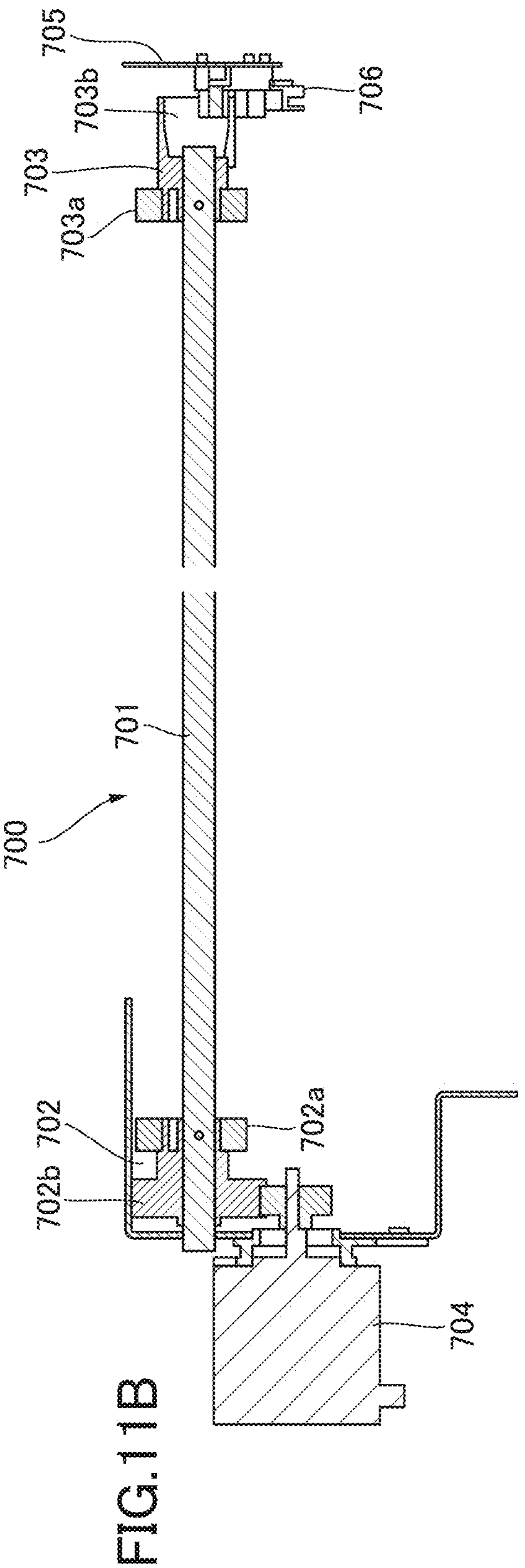
FIG. 11B is a section view of the pressure cancellation mechanism of the conveyance roller pair in the conveyance portion of the registration unit.

Next, a driving configuration of the conveyance roller pair 34-4 and the slide mechanism 600 that slides the conveyance roller pair 34-4 in the present embodiment will be described with reference to FIGS. 9, 10, 11A, and 11B. FIG. 9 is a perspective view of the driving mechanism of the conveyance roller pair 34-4 in the conveyance portion 50A of the registration unit 50. FIG. 10 is a perspective view of the slide mechanism 600 of the conveyance roller pair 34-4 in the conveyance portion 50A of the registration unit 50. FIG. 11A is a perspective view of a pressure cancellation mechanism of the conveyance roller pair 34-4 in the conveyance portion 50A of the registration unit 50. FIG. 11B is a section view of the pressure cancellation mechanism of the conveyance roller pair 34-4 in the conveyance portion 50A of the registration unit 50.

The conveyance roller pair 34-4 is rotationally driven by a roller driving mechanism 800, and is configured to be movable in the width direction W by the slide mechanism 600 while nipping the sheet. In addition, the conveyance roller pair 34-4 is configured to be switchable between the nip-conveyance state in which the sheet is nipped in a nip of the roller pair constituting the conveyance roller pair 34-4, and the non-nipping state in which the roller pair is separated.

The conveyance roller pair 34-4 is constituted by an upper roller 401 and a lower roller 402 as illustrated in FIG. 11A. The lower roller 402 is rotatably supported by a frame 201 as illustrated in FIG. 11A, and the upper roller 401 is rotatably supported by a pressurizing arm 405 as illustrated in FIG. 10. The pressurizing arm 405 is rotatably fixed by a shaft 201*a* formed on the frame 201 as illustrated in FIG. 10. The upper roller 401 is pressed against the lower roller 402 by a tension spring 407. In addition, a roller gear 412 that transmits the drive from a roller driving mechanism 800 to the lower roller 402 is fixed to one end portion of the lower roller 402 as illustrated in FIG. 9.

The roller driving mechanism 800 that rotates the conveyance roller pair 34-4 includes a slide roller driving motor 801, driving gears 802 and 803, and the roller gear 412 as illustrated in FIG. 9. The slide roller driving motor 801 is fixed to the frame 201, and the drive of the slide roller driving motor 801 is transmitted to the roller gear 412 via the driving gears 802 and 803. In addition, the driving gear 803 is formed to have a tooth surface having a length d larger than the reciprocation width of the roller gear 412 such that engagement between the driving gear 803 and the roller gear 412 is maintained. The driving gear 802 is rotatably fixed to a fixing shaft 201*b* of the frame 201, and the driving gear 803 is rotatably fixed to a fixing shaft 201*c*. To be noted, as the slide roller driving motor 801, a stepping motor is used in the present embodiment. According to such a configuration, the drive of the slide roller driving motor 801 is transmitted to the roller gear 412 to rotate the conveyance roller pair 34-4.

The slide mechanism 600 that moves the conveyance roller pair 34-4 in the width direction W includes a slide motor 601 screwed to a motor support plate 603 in the state of being fixed to a motor stage 602. A pulley support plate 604 is screwed to a position above the motor support plate 603 with the slide motor 601 therebetween. Pulley stages 605 and 606 are fixed to the pulley support plate 604. As illustrated in FIG. 9, a pulley shaft 607 is rotatably fixed to the pulley stage 605, and a pulley shaft 608 is rotatably fixed to the pulley stage 606. Pulleys 609 and 610 are fixed to the pulley shaft 607, and a pulley 611 is fixed to the pulley shaft 608. In addition, a pulley 612 is fixed to the distal end of an output shaft of the slide motor 601. A timing belt 613 is looped over the pulleys 609 and 612, and a timing belt 614 is looped over the pulleys 610 and 611 as illustrated in FIG. 10.

As illustrated in FIG. 10, a holder 415 is rotatably supported at an end portion on the roller gear 412 side of the lower roller 402 via a bearing. A sensor flag 416 that detects the home position of the upper roller 401 and the lower roller 402 of the conveyance roller pair 34-4 in the width direction W is attached to the holder 415. When the upper roller 401 and the lower roller 402 of the conveyance roller pair 34-4 are in the home position, the sensor flag 416 is detected by a sensor 615 provided on the pulley support plate 604. In addition, the holder 415 is fixed to the timing belt 614 by using a stopper 616 and an unillustrated screw. According to such a configuration, the timing belt 614 is rotated by the drive of the slide motor 601, and the lower roller 402 of the conveyance roller pair 34-4 reciprocates in the width direction W in accordance with the rotation of the timing belt 614. In addition, the upper roller 401 of the conveyance roller pair 34-4 is engaged with the lower roller 402 via an unillustrated engagement member, and reciprocates in the width direction W together with the lower roller 402. In the present embodiment, as will be described in detail later, the slide motor 601 drives and the conveyance roller pair 34-4 moves in the width direction W on the basis of the detection result of the position of the end portion of the sheet in the width direction W detected by the CIS 60.

A pressure cancellation mechanism 700 that brings the upper roller 401 and the lower roller 402 of the conveyance roller pair 34-4 into contact with and out of contact from each other includes a pressure cancellation shaft 701 positioned to the frame 201 as illustrated in FIG. 11A. In addition, the pressure cancellation mechanism 700 includes cams 702 and 703 fixed to the pressure cancellation shaft 701 as illustrated in FIG. 11B. Deep groove ball bearings 702*a* and 703*a* are respectively press-fit in positions eccentric from rotation centers in the cams 702 and 703 as illustrated in FIG. 11B. In addition, as illustrated in FIG. 11A, a gear 702*b* is formed in the cam 702, and the pressure cancellation shaft 701 rotates as a result of transmitting the drive of the pressure cancellation motor 704 via the cam 702.

In addition, the deep groove ball bearing 702*a* is disposed at a position where the deep groove ball bearing 702*a* can abut the pressurizing arm 405, and the deep groove ball bearing 702*a* swings the pressurizing arm 405 against the urging force of the spring 407 when the pressure cancellation shaft 701 is rotated once. By swinging the pressurizing arm 405 in this manner, the upper roller 401 and the lower roller 402 can be brought into contact with and out of contact from each other once. To be noted, an unillustrated pressurizing arm is also provided on the side on which the deep groove ball bearing 703*a* is provided in the axial direction of the pressure cancellation shaft 701. In addition, the cam 703 is provided with a sensor flag 703*b* as illustrated in FIG. 11B. When the sensor flag 703*b* is detected by a sensor 706 fixed to a sensor support plate 705 fixed to the frame 201, the phase of the pressure cancellation shaft 701 is determined, and the rotation of the pressure cancellation motor 704 is controlled in accordance with the phase of the pressure cancellation shaft 701. In addition, the phase of the cams 702 and 703 is determined such that the sensor flag 703*b* shields the sensor 706 when the upper roller 401 and the lower roller 402 of the conveyance roller pair 34-4 are in contact with each other.

Configuration of Control System of Printer

Figure 12:
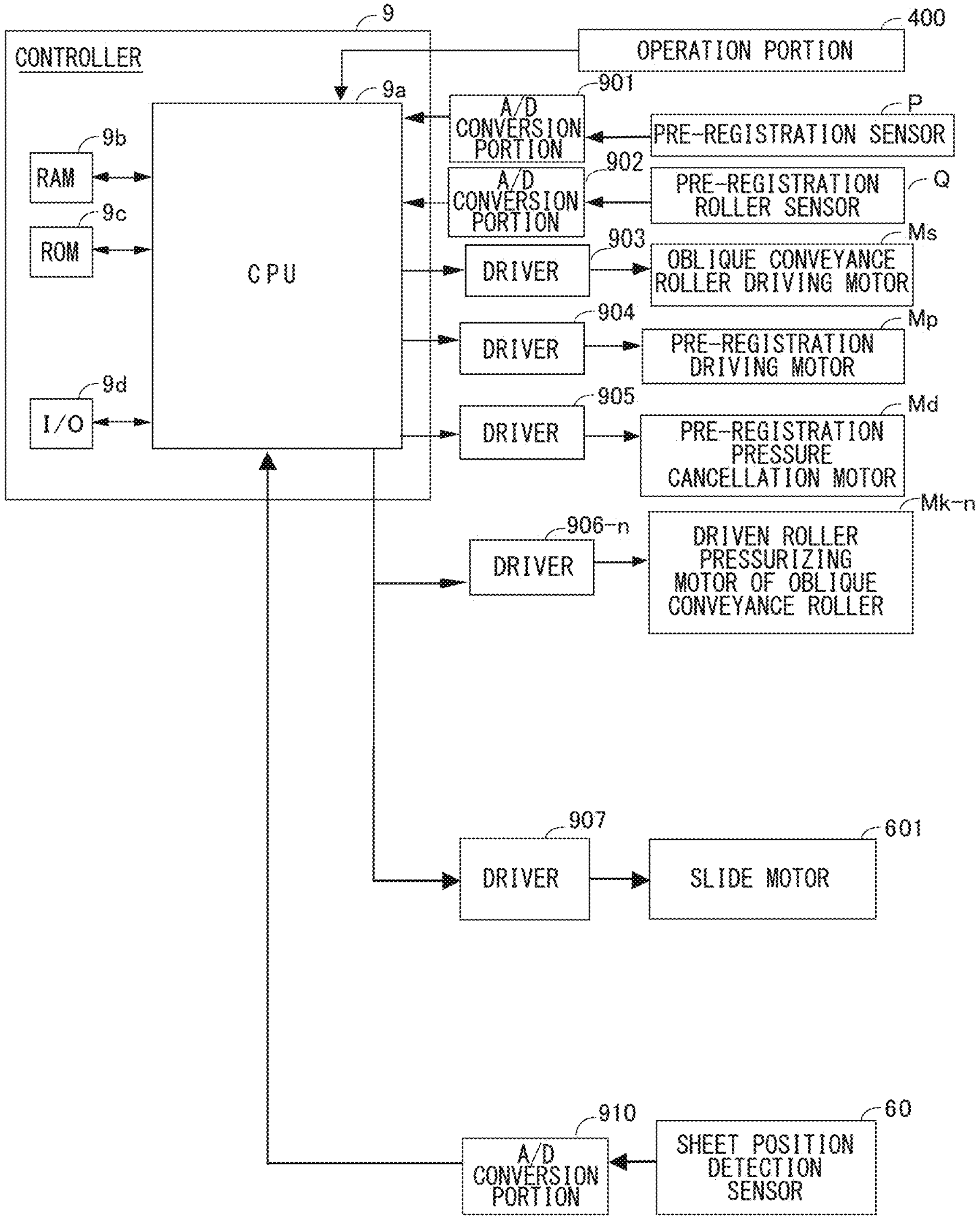
FIG. 12 is a block diagram illustrating a control system of the printer according to the first embodiment.

Next, a configuration of the control system of the printer 1 will be described with reference to FIG. 12. FIG. 12 is a block diagram illustrating the control system of the printer according to the first embodiment.

As illustrated in FIG. 12, the registration unit 50 in the printer 1 is controlled by the controller 9. The controller 9 includes a central processing unit: CPU 9*a* serving as a calculation portion, a random access memory: RAM 9*b* and a read-only memory: ROM 9*c* serving as storage portions, and an interface: I/O 9*d* to connect to an external device or a network.

The CPU 9*a* performs control on the basis of information input via an operation portion 400 serving as a user interface, detection signals from the pre-registration sensor P and the pre-registration roller sensor Q described above, and the like. The detection signals from the pre-registration sensor P and the pre-registration roller sensor Q are input to the CPU 9*a* respectively via A/D conversion portions 901 and 902. In addition, a detection signal from the sheet position detection sensor 60 is input to the CPU 9*a* via an A/D conversion portion 910. The CPU 9*a* loads a program stored in the ROM 9*c* or the like and executes the program. The CPU 9*a* controls driving of the motors Ms, Mp, Md, Mk-n, and 601 serving as actuators of the registration unit 50 via drivers 903, 905, 606-*n*, and 907.

Outline of Operation of Registration Unit

Operation of Conveyance portion

Figure 13A:
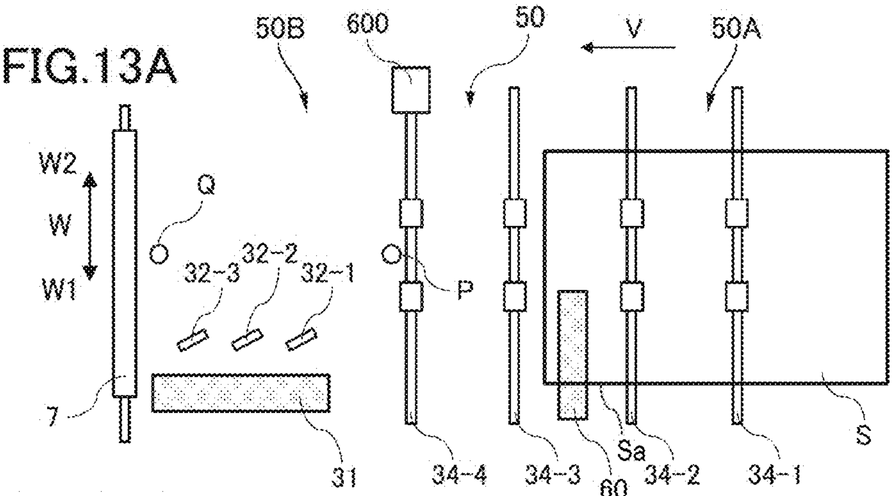
FIG. 13A is a top view illustrating a state in which a sheet has been conveyed to the conveyance portion of the registration unit according to the first embodiment.
Figure 13B:
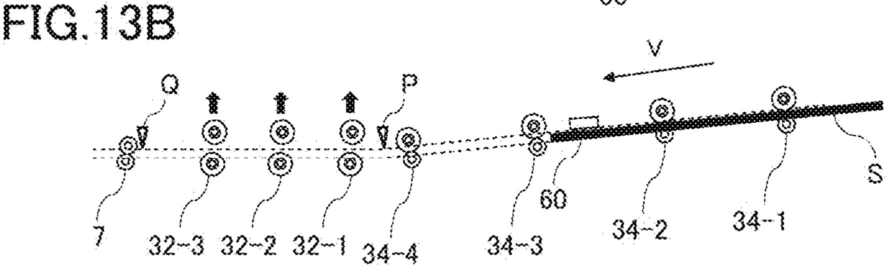
FIG. 13B is a section view in the state of FIG. 13A.
Figure 13C:
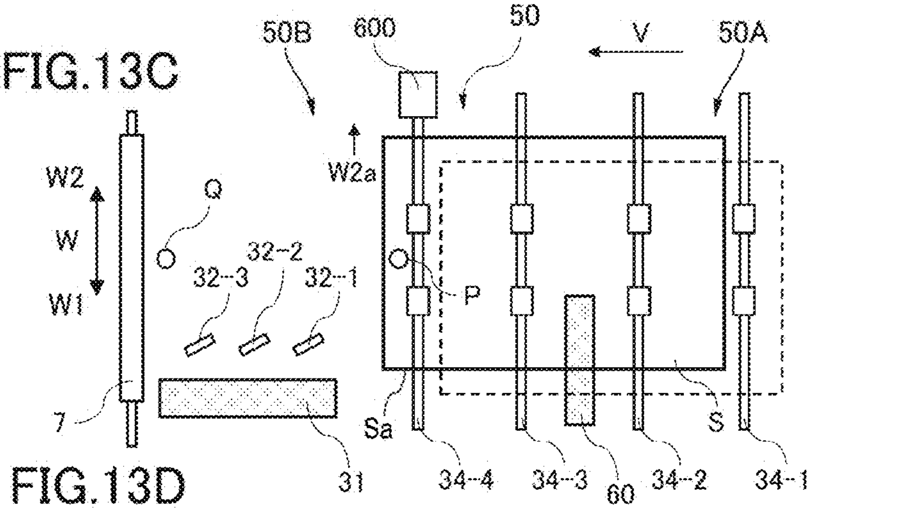
FIG. 13C is a top view illustrating a state in which the sheet has been conveyed to a position in which the sheet can be conveyed by a conveyance roller pair from the state illustrated in FIGS. 13A and 13B.
Figure 13D:
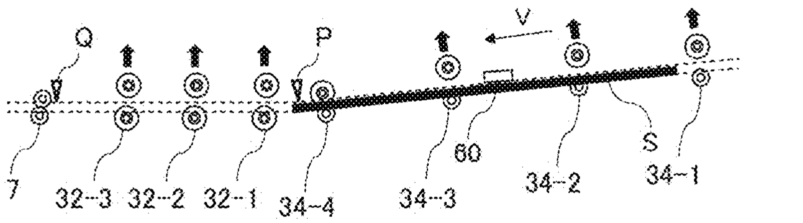
FIG. 13D is a section view in the state of FIG. 13C.

Next, the outline of the operation of the registration unit 50 will be described. First, a pre-skew correction shift operation of the conveyance portion 50A performed before the skew correction in the registration unit 50 will be described with reference to FIGS. 13A and 13B. FIG. 13A is a top view illustrating a state in which the sheet is conveyed by the conveyance portion 50A of the registration unit 50 according to the first embodiment. FIG. 13B is a section view of the state illustrated in FIG. 13A. FIG. 13C is a top view illustrating a state in which the sheet has been conveyed from the state illustrated in FIGS. 13A and 13B to a position where the sheet can be conveyed by the conveyance roller pair 34-4. FIG. 13D is a section view of the state illustrated in FIG. 13C.

As illustrated in FIGS. 13A and 13B, when the sheet S conveyed in the sheet conveyance direction V reaches the sheet position detection sensor 60 in the registration unit 50, the position of an end portion (side end position) of the sheet S is detected by the sheet position detection sensor 60. To be noted, in the present embodiment, the sheet position detection sensor 60 detects the position of a side end Sa that is a downstream end of the sheet S in the first direction W1. The CPU 9*a* illustrated in FIG. 12 calculates the amount of displacement of the detected side end position of the sheet S with respect to a zero-point position serving as the standard position of the sheet position detection sensor 60, and calculates the amount of shift in the width direction W by the conveyance roller pair 34-4, that is, the shift amount of the pre-skew correction shift operation.

Next, the CPU 9*a* causes the conveyance roller pairs 34-1, 34-2, and 34-3 to separate, that is, switches the conveyance roller pairs 34-1, 34-2, and 34-3 to the non-nipping state when the sheet S has reached the conveyance roller pair 34-4 in the nip-conveyance state as illustrated in FIGS. 13C and 13D. The CPU 9*a* shifts (moves) the conveyance roller pair 34-4 in the second direction W2 by the calculated shift amount described above, and shifts the sheet S such that the side end Sa of the sheet S is aligned with the zero-point position serving as the standard position of the sheet position detection sensor 60. As a result of this, the pre-skew correction shift operation is completed, and thus the distance between the standard member 31 and the side end Sa of the sheet S in the width direction W can be stabilized in the skew correction of the sheet S by the skew correction portion 50B. That is, the sheet conveyance speed can be stabilized.

Operation of Skew Correction Portion

Figure 14A:
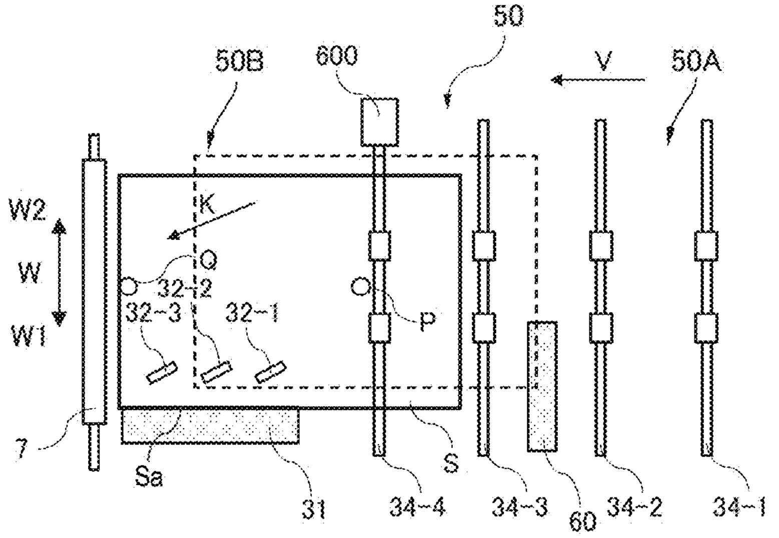
FIG. 14A is a top view illustrating a state in which skew correction has been performed by a skew correction portion of the registration unit according to the first embodiment.
Figure 14B:
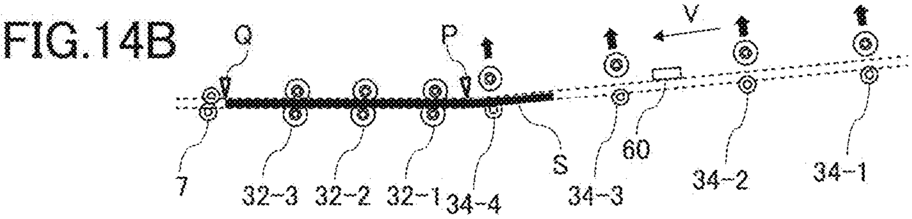
FIG. 14B is a section view in the state of FIG. 14B.

Next, in the registration unit 50, the skew correction operation of the skew correction portion 50B will be described with reference to FIGS. 14A and 14B. FIG. 14A is a top view illustrating a state in which the skew correction has been performed in the skew correction portion of the registration unit according to the first embodiment. FIG. 14B is a section view in the state illustrated in FIG. 14A.

As illustrated in FIGS. 14A and 14B, in the registration unit 50, the sheet S is conveyed by the oblique conveyance roller pairs 32-1 to 32-3 in the nip-conveyance state (pressurized state) in a direction inclined with respect to the sheet conveyance direction V indicated as an arrow K direction in the drawings. As a result of this, the side end Sa of the sheet S is caused to abut the standard surface 31*a* of the standard member 31. In the registration unit 50, when the skew correction is performed, the oblique conveyance roller pairs 32-1 to 32-3 are in the nip-conveyance state, and the conveyance roller pairs 34-1 to 34-4 are in the non-nipping state. Therefore, in the registration unit 50, the skew correction is performed by the oblique conveyance roller pairs 32-1 to 32-3 after the conveyance roller pairs 34-1 to 34-4 are separated, and thus the skew correction can be performed without interference with the conveyance roller pairs 34-1 to 34-4.

Operation of Registration Roller Pair

Figure 15A:
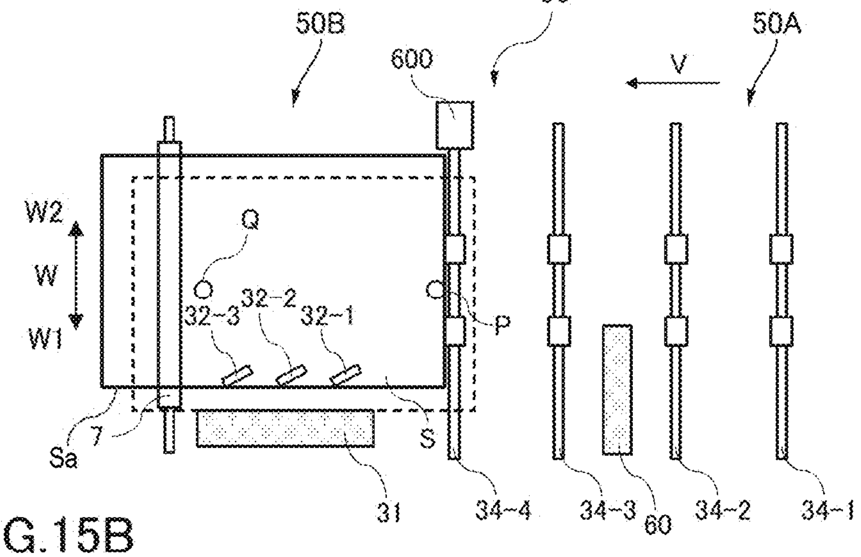
FIG. 15A is a top view illustrating a state in which a shift has been performed by a registration roller pair of the registration unit according to the first embodiment.
Figure 15B:
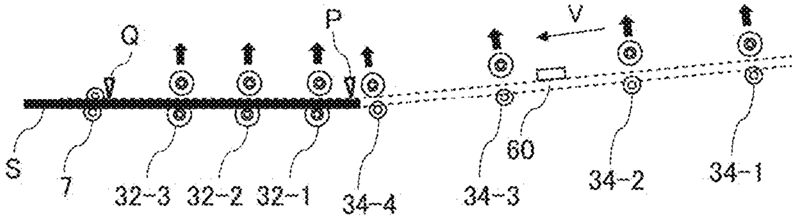
FIG. 15B is a section view in the state of FIG. 15A.

As illustrated in FIGS. 15A and 15B, the sheet S is shifted in the second direction W2 by the registration roller pair 7 such that the position in the width direction W of the sheet S matches the position in the width direction W of the image transferred in the secondary transfer portion 1C illustrated in FIG. 1. That is, the registration roller pair 7 performs a post-skew correction shift operation in the second direction W2 while conveying the sheet S in the sheet conveyance direction V such that the position in the width direction W of the sheet S matches the position in the width direction W of the image formed by the image formation engine 513 illustrated in FIG. 1. As a result of this, an image can be formed on the sheet S in a state in which the position in the width direction W of the sheet S having undergone skew correction has been adjusted by the registration unit 50 so as to match the position in the width direction W of the image transferred in the secondary transfer portion 1C.

To be noted, in the registration unit 50, the position in the width direction W of the sheet S is shifted by the registration roller pair 7 after the oblique conveyance roller pairs 32-1 to 32-3 are switched to the non-nipping state (separated). Therefore, the position in the width direction W can be shifted without interference with the oblique conveyance roller pairs 32-1 to 32-3.

Control of Registration Uni in Print Job

Figure 16:
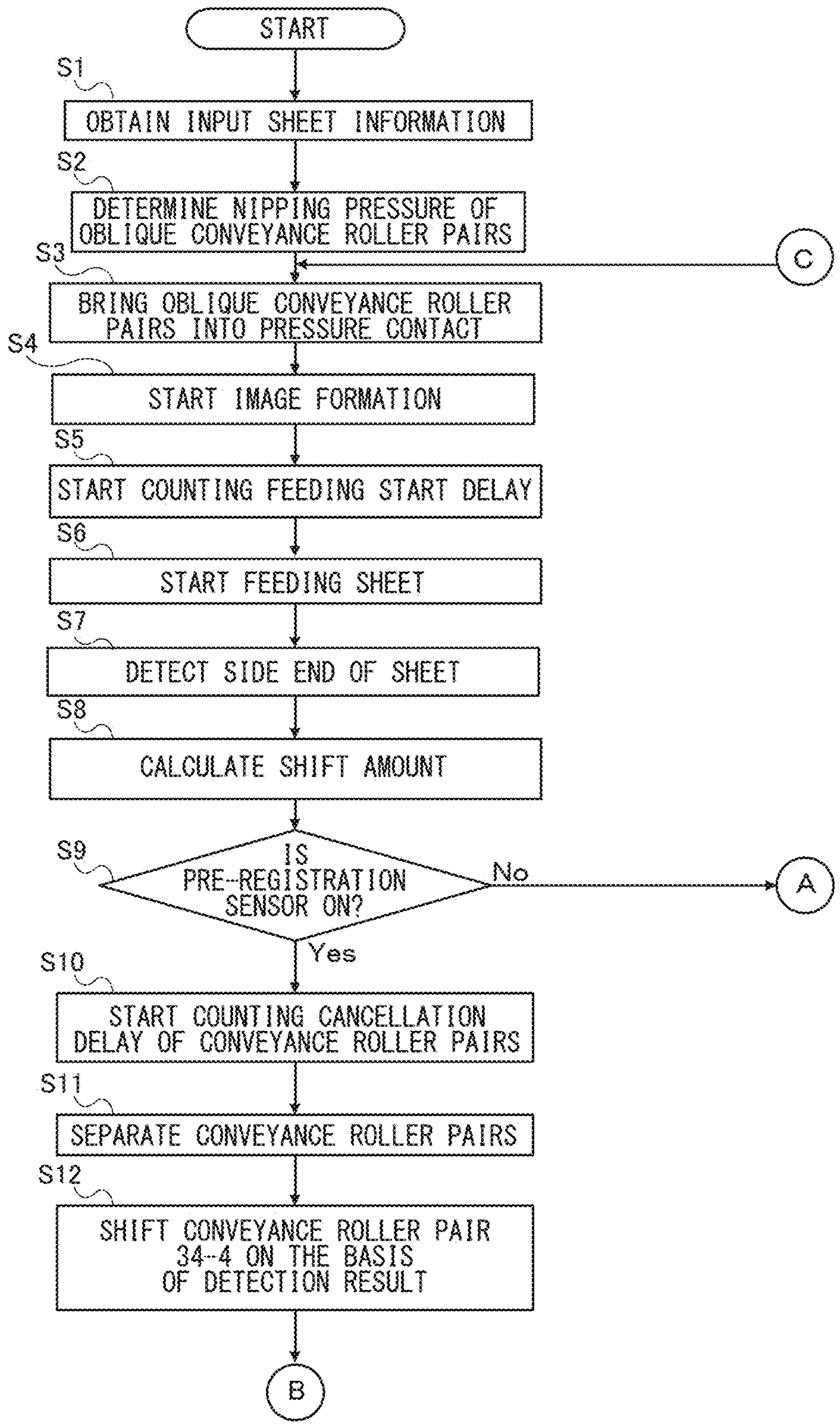
FIG. 16 is a flowchart illustrating control of the conveyance portion of the registration unit during execution of a normal print job according to the first embodiment.
Figure 17:
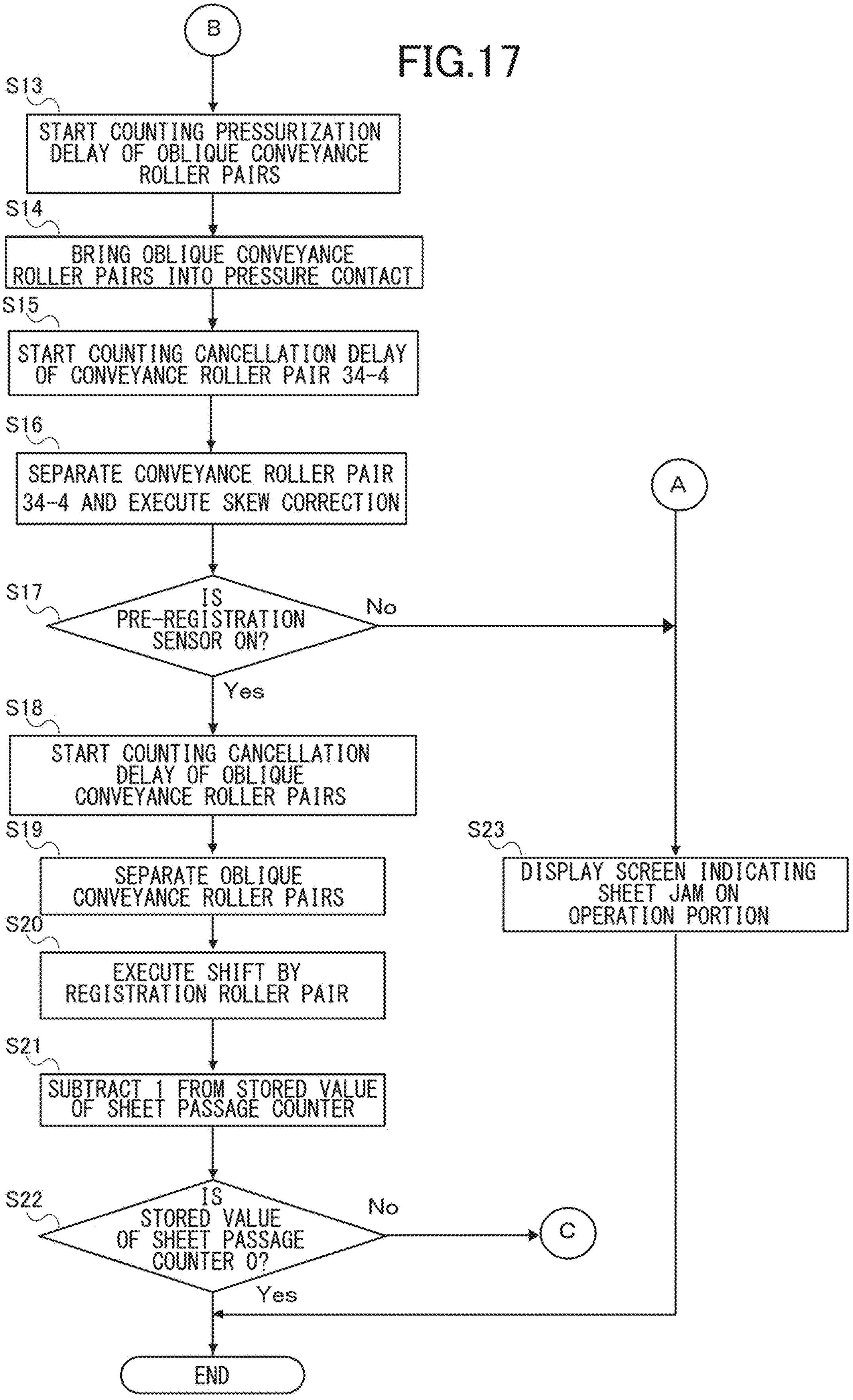
FIG. 17 is a flowchart illustrating control of the skew correction portion and the registration roller pair of the registration unit during execution of the normal print job according to the first embodiment.

Next, control in the registration unit 50 performed in a case where a command to perform printing on one or more sheets is transmitted from, for example, an external computer, the operation portion 400, or the like to the controller 9, and the print job is executed will be described in detail with reference to FIGS. 16 and 17. FIG. 16 is a flowchart illustrating control of the conveyance portion 50A of the registration unit 50 during execution of a normal print job according to the first embodiment. FIG. 17 is a flowchart illustrating control of the skew correction portion 50B and the registration roller pair 7 of the registration unit 50 during execution of the normal print job according to the first embodiment.

In step S1, the controller 9 first obtains information about the sheet from information included in the print job input from the external computer or the operation portion 400 or information preset for the feeding cassette 51. This information about the sheet will be hereinafter referred to as sheet information. In this processing, the controller 9 obtains the sheet information about the grammage, size, number, and type of the sheets. In the sheet information, the type information includes information indicating which of plain paper sheets for offices, coated paper sheets, cardboards, and the like the sheet is. In addition, the controller 9 obtains the number of sheets to be passed through the registration unit 50 in the started print job from the information of the number of sheets included in the sheet information, and sets the number as the initial value of a stored value stored in a sheet passage counter.

Next, in step S2, the controller 9 determines the nipping pressure of the oblique conveyance roller pairs 32-1 to 32-3. In this processing, on the basis of the sheet information obtained in the processing of step S1, the controller 9 obtains table data in which preset sheet types are associated with nipping pressures from the ROM 9*c*, and determines the nipping pressure of the oblique conveyance roller pairs 32-1 to 32-3. Then, in step S3, the driven roller pressurizing motors Mk-n illustrated in FIG. 12 are driven such that the determined nipping pressure is achieved, and thus the oblique conveyance roller pairs 32-1 to 32-3 are brought into pressure contact to switch to the nip-conveyance state.

Next, in step S4, the controller 9 starts formation of an image by the image formation engine 513. In step S5, the controller 9 starts counting a sheet feeding start delay with respect to the timing at which the processing of step S4 is started. The sheet feeding start delay is a time difference between a time that elapses between formation of the image on the intermediate transfer belt 506 and conveyance of the image to the secondary transfer portion 1C and a time that elapses while the sheet is conveyed from the feeding cassette 51 to the secondary transfer portion 1C. The controller 9 sets a value to be counted as the feeding start delay corresponding to the image whose formation is started in step S4, and starts counting.

In step S6, the controller 9 starts sheet passage of the sheet from the feeding cassette 51 when the count of the feeding start delay reaches the set value. In step S7, the controller 9 causes the sheet position detection sensor 60 to detect the side end position of the sheet at a first timing when the sheet has been conveyed to reach the sheet position detection sensor 60. To be noted, the sheet reaching the sheet position detection sensor 60 can be detected by a signal output from the sheet position detection sensor 60.

Next, in step S8, the controller 9 calculates the shift amount of the sheet. In this processing, the controller 9 calculates the amount of displacement with respect to the zero-point position set as the standard position of the sheet position detection sensor 60 from the detection result of the sheet position detection sensor 60. Then, the controller 9 determines the shift amount for shifting the conveyance roller pair 34-4 in the width direction W in accordance with the calculated displacement amount.

After the processing of step S8 is executed, in step S9, the controller 9 determines whether or not the pre-registration sensor P has been turned on. In this processing, the controller 9 determines whether or not the sheet whose side end position has been detected by the sheet position detection sensor 60 has reached the pre-registration sensor P from a signal of the pre-registration sensor P.

In the processing of step S9, in the case where it has been determined that the pre-registration sensor P has not been turned on, that is, in the case where the result of step S9 is No, the sheet has not been conveyed to the pre-registration sensor P at an expected timing, and therefore the controller 9 determines that a sheet jam has occurred. The controller 9 displays a notification indicating the occurrence of a sheet jam on the operation portion 400 in step S23 of FIG. 17, and finishes the control.

In contrast, in the case where it has been determined that the pre-registration sensor P has been turned on, that is, in the case where the result of step S9 is Yes, in step S10, the controller 9 starts counting the cancellation delay of the conveyance roller pairs 34-1 to 34-3. At the time when the processing of step S10 is executed, in the registration unit 50, the sheet has reached the pre-registration sensor P positioned downstream of the conveyance roller pair 34-4 in the conveyance direction, and the pre-skew correction shift operation by the conveyance roller pair 34-4 can be performed. Therefore, in the processing of step S12, the controller 9 sets the value of the cancellation delay that is the time that the conveyance roller pairs 34-1 to 34-3 take to switch from the nip-conveyance state to the non-nipping state, and starts counting.

In step S11, at the timing at which the count of the cancellation delay in step S10 has reached the set value, the controller 9 separates the driving rollers 13 and the driven rollers 14 of the conveyance roller pairs 34-1 to 34-3 to switch to the non-nipping state. As a result of this, in the registration unit 50, a state in which the sheet is nipped by the conveyance roller pair 34-4 and is not nipped by the conveyance roller pairs 34-1 to 34-3 is taken.

Then, in step S12, the controller 9 shifts the conveyance roller pair 34-4 in the width direction W by a shift amount corresponding to the detection result of the sheet position detection sensor 60. In other words, the controller 9 moves the conveyance roller pair 34-4 in the width direction W by the slide mechanism 600 on the basis of the position of the side end Sa of the sheet S nipped by the conveyance roller pair 34-4 such that the position of the side end Sa in the width direction W matches the zero-point position. In this processing, the controller 9 shifts the conveyance roller pair 34-4 by a shift amount calculated in the processing of step S8, and shifts the sheet to a position where the distance between the standard surface 31*a* of the standard member 31 and the side end Sa of the sheet is a predetermined distance, that is, to a zero-point position serving as a standard position. The zero-point position is a position away from the standard surface 31*a* by a predetermined distance in the second direction W2. As described above, the shift operation by the conveyance roller pair 34-4 is executed when the conveyance roller pair 34-4 is nipping the sheet S and before the sheet S reaches the oblique conveyance roller pair 32-1.

To be noted, in the present embodiment, description is given on the premise that the sheet is shifted while being conveyed when shifting the sheet in the width direction W by the conveyance roller pair 34-4 in step S12. However, to stabilize the shift of the sheet, the sheet may be shifted by the conveyance roller pair 34-4 after stopping the conveyance of the sheet, and then the conveyance of the sheet may be resumed.

After the processing of step S12 is executed, in step S13 the controller 9 starts counting the pressurization delay of the oblique conveyance roller pairs 32-1 to 32-3 as illustrated in FIG. 17. At the time when the processing of step S13 is executed, in the registration unit 50, the pre-skew correction shift of the sheet has been completed. In addition, in the registration unit 50, the oblique conveyance roller pairs 32-1 to 32-3 are in the non-nipping state to avoid interference of the oblique conveyance roller pairs 32-1 to 32-3 with the shift by the conveyance roller pair 34-4. Therefore, in the processing of step S13, the controller 9 sets the value of the pressurization delay that is a time that the oblique conveyance roller pairs 32-1 to 32-3 take to switch from the non-nipping state to the nip-conveyance state, and starts counting.

Next, in step S14, at the timing at which the counting of the pressurization delay is finished, the controller 9 brings the driving rollers 320-1 to 320-3 and the driven rollers 331-1 to 331-3 of the oblique conveyance roller pairs 32-1 to 32-3 into pressure contact with each other. Further, in step S15, the controller 9 starts counting the cancellation delay that is a time that the conveyance roller pair 34-4 takes to switch from the nip-conveyance state to the non-nipping state. Then, in step S16, at a timing at which the counting of the cancellation delay is finished, the lower roller 402 and the upper roller 401 of the conveyance roller pair 34-4 are separated, and oblique conveyance by the oblique conveyance roller pairs 32-1 to 32-3 is performed to execute the skew correction.

That is, as a result of the processing of steps S13 to S16 being executed, in the registration unit 50, the conveyance roller pair 34-4 does not nip the sheet, and nipping and conveyance of the sheet by the oblique conveyance roller pairs 32-1 to 32-3 are possible. In the registration unit 50, the oblique conveyance roller pairs 32-1 to 32-3 nip and convey the sheet, and thus the skew correction of the sheet in which the sheet is conveyed while causing the side end Sa of the sheet to abut the standard surface 31*a* of the standard member 31 is performed.

Next, in step S17, the controller 9 determines whether or not the pre-registration roller sensor Q has been turned on. In this processing, the controller 9 determines, from a signal of the pre-registration roller sensor Q, whether or not the sheet having undergone skew correction by the oblique conveyance roller pairs 32-1 to 32-3 has reached the pre-registration roller sensor Q.

In the case where it has been determined that the pre-registration roller sensor Q has not been turned on in the processing of step S17, that is, in the case where the result of step S17 is No, the sheet has not been conveyed to the pre-registration roller sensor Q at an expected timing, and therefore the controller 9 determines that a sheet jam has occurred. In this case, the controller 9 displays a notification indicating the occurrence of a sheet jam on the operation portion 400 in step S23 of FIG. 17, and finishes the control processing related to registration correction and skew correction.

In contrast, in the case where it has been determined that the pre-registration roller sensor Q has been turned on, that is, in the case where the result of step S17 is Yes, in step S18, the controller 9 starts counting the cancellation delay of the oblique conveyance roller pairs 32-1 to 32-3. At the time when the processing of step S18 is executed, in the registration unit 50, the leading end of the sheet has reached the pre-registration roller sensor Q positioned downstream of the oblique conveyance roller pairs 32-1 to 32-3 in the conveyance direction. Therefore, conveyance and shift of the sheet by the registration roller pair 7 can be performed. Therefore, in the processing of step S18, the controller 9 sets the value of the cancellation delay that is the time that the oblique conveyance roller pairs 32-1 to 32-3 take to switch from the nip-conveyance state to the non-nipping state, and starts counting.

In step S19, at the timing at which the counting of the cancellation delay is finished, the controller 9 separates the driving rollers 320-1 to 320-3 and the driven rollers 331-1 to 331-3 of the oblique conveyance roller pairs 32-1 to 32-3 from each other. As a result of this, in the registration unit 50, a state in which the sheet is nipped by the registration roller pair 7 and is not nipped by the oblique conveyance roller pairs 32-1 to 32-3 is taken.

Next, in step S20, the controller 9 shifts the position in the width direction W of the sheet having undergone the skew correction by the registration roller pair 7 such that the position in the width direction W of the sheet matches the position in the width direction W of the image transferred in the secondary transfer portion 1C. In this processing, the controller 9 shifts the position in the width direction W of the sheet nipped by the registration roller pair 7 to a position corresponding to the position of the center in the width direction W of the image formed by the image formation engine 513.

Next, in step S21, the controller 9 subtracts 1 from the number of sheet passage counted by a sheet passage counter. In this processing, since a series of skew correction operation, that is, the pre-skew correction shift, the skew correction, and the post-skew correction shift of one sheet have been finished, the controller 9 subtracts “1”, which is a value corresponding to one sheet, from the stored value of the sheet passage counter.

Then, in step S22, the controller 9 determines whether or not the stored value of the sheet passage counter is 0. In this processing, in the case where it has been determined that the stored value of the sheet passage counter is not 0, that is, in the case where the result of step S22 is No, the controller 9 returns the process to step S3 to execute a series of skew correction operation on a sheet to be conveyed next in the current print job. In contrast, in the case where it has been determined that the stored value of the sheet passage counter is 0, that is, in the case where the result of step S22 is Yes, the controller 9 determines that the current print job has been completed, and finishes the control.

Figure 18A:
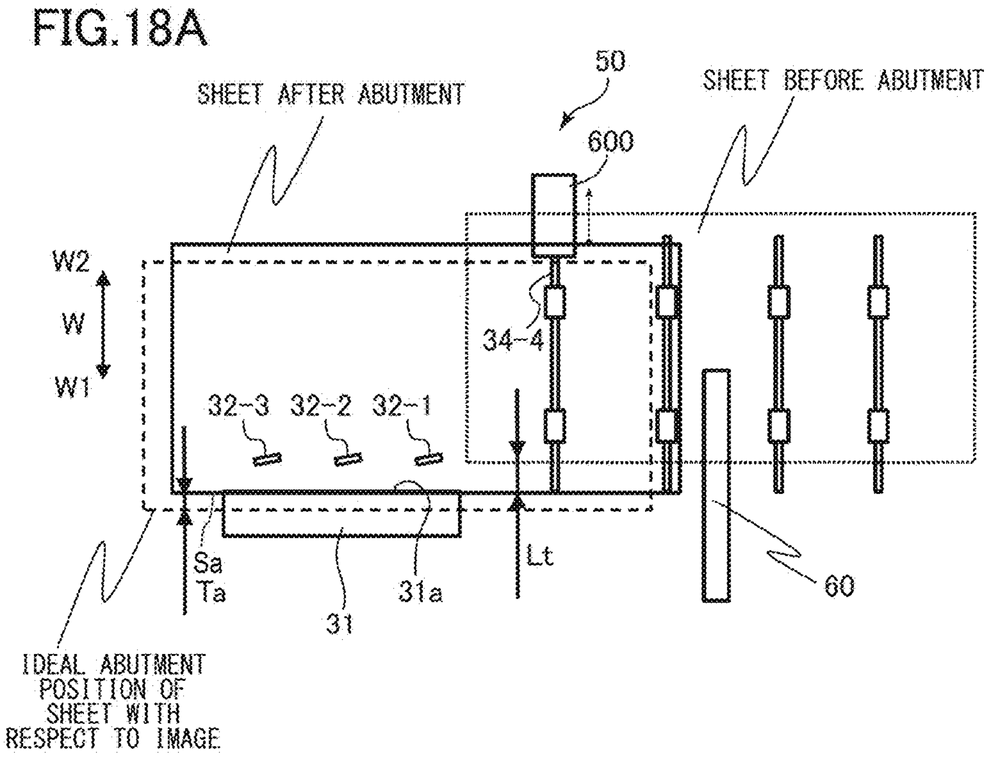
FIG. 18A is a top view illustrating an ideal sheet position with respect to a transferred image and a sheet position of the sheet abutting a standard member whose position in the width direction is not adjusted in the registration unit.
Figure 18B:
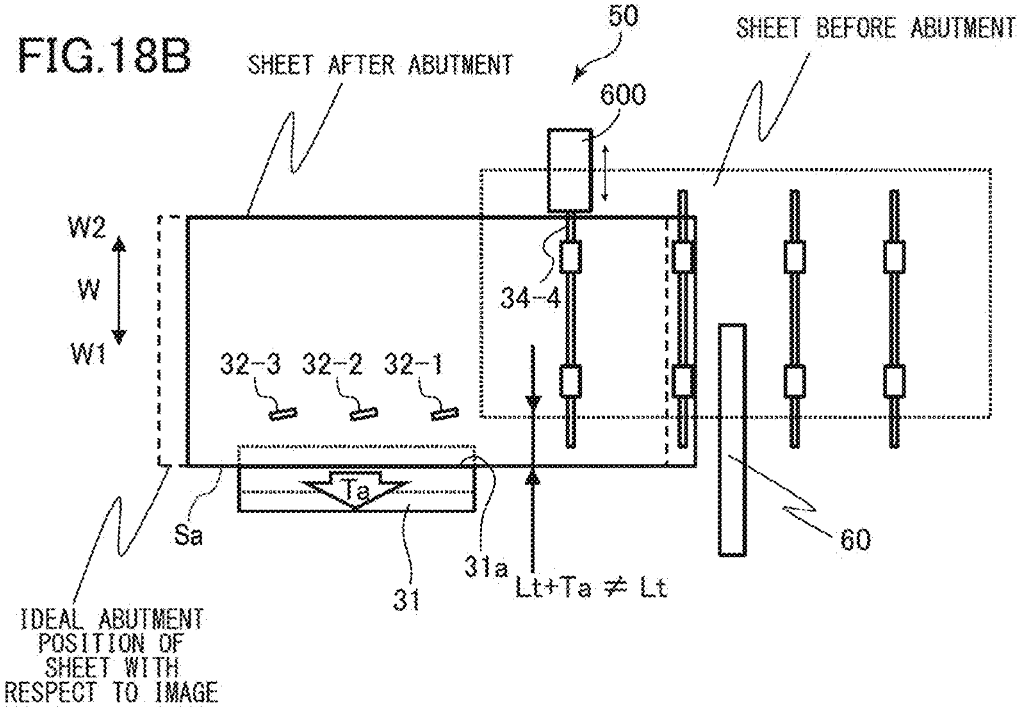
FIG. 18B is a top view illustrating the ideal sheet position with respect to the transferred image and a sheet position of the sheet abutting the standard member whose position in the width direction has been adjusted in the registration unit.
Figure 19:
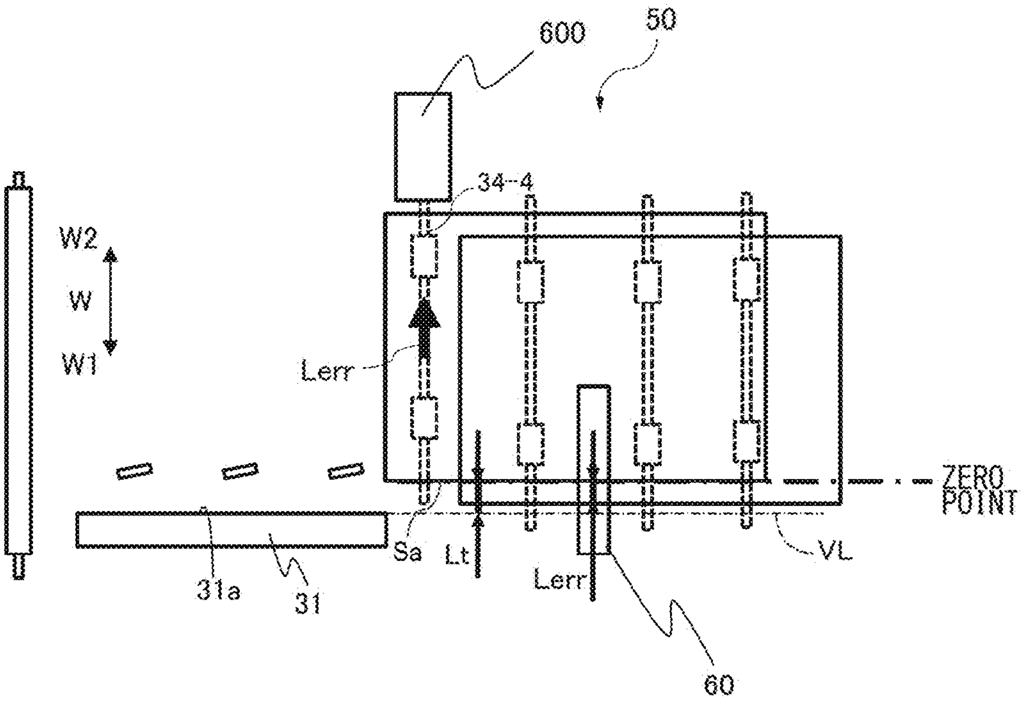
FIG. 19 is a top view illustrating a shift operation of the sheet before skew correction in the registration unit.
Figure 20:
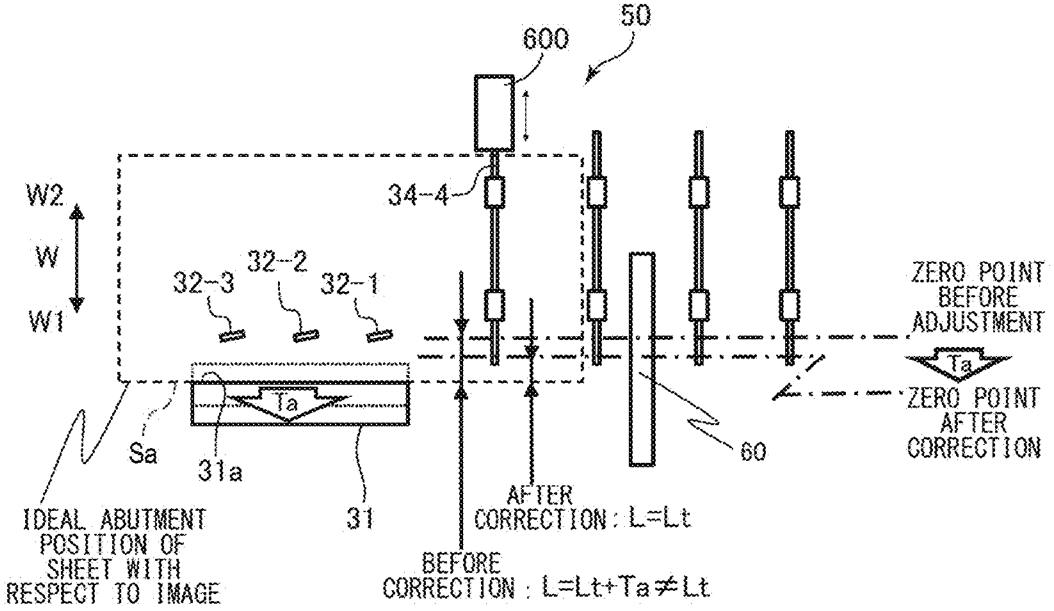
FIG. 20 is a top view illustrating a zero-point position after adjustment of the position of the standard member in the width direction in the registration unit.

Adjustment of Position in Width Direction of Standard Member and Deviation Resulting from Adjustment Next, adjustment of the position of the standard member 31 in the width direction W, deviation of the distance Lt between the side end Sa of the sheet before skew correction and the standard surface 31*a* of the standard member 31 resulting therefrom, and the correction thereof will be described with reference to FIGS. 18A to 20. FIG. 18A is a top view illustrating an ideal sheet position with respect to the transferred image and the sheet position of the sheet abutting the standard member 31 whose position in the width direction W is not adjusted in the registration unit 50. FIG. 18B is a top view illustrating the ideal sheet position with respect to the transferred image and the sheet position of the sheet abutting the standard member 31 whose position in the width direction W has been adjusted in the registration unit 50. FIG. 19 is a top view illustrating the shift operation of the sheet before skew correction in the registration unit 50. FIG. 20 is a top view illustrating the corrected zero-point position after adjustment of the position of the standard member 31 in the width direction W in the registration unit 50. To be noted, the standard member 31 according to the first embodiment is configured to be positionally adjustable (movable) in the width direction W with respect to the apparatus body 1A of the printer 1.

As described above, after the side end Sa of the sheet has been caused to abut the standard member 31 by the skew correction portion 50B of the registration unit 50, the sheet is shifted in the width direction W by the registration roller pair 7. That is, the sheet is shifted in the width direction W such that the position of the sheet matches the position of the image formed by the image formation engine 513. The amount (distance) of the shift by the registration roller pair 7 at this time is a certain amount from the standard surface 31*a* of the standard member 31. That is, alignment with the position of the image formed by the image formation engine 513 can be performed in accordance with the position of the standard surface 31*a* of the standard member 31.

As illustrated in FIG. 18A, a case where the position of the standard member 31 is displaced from an ideal abutment position of the sheet by a displacement amount Ta with respect to the position in the width direction W of the image transferred by the image formation engine 513 is assumed. In this case, the position of the image formed on the sheet is displaced by the displacement amount Ta. Therefore, a service worker that installs and repairs the printer 1 measures the position of the image formed on the sheet, for example, the margin on the standard member side. Then, the service worker adjusts the position in the width direction W of the standard member 31 by the displacement amount Ta obtained from the measured position of the image. As a result of this, the position of the sheet shifted by the registration roller pair 7 by the certain amount is aligned with the position of the image transferred onto the sheet.

Meanwhile, as illustrated in FIG. 19, a standard position (zero-point position) serving as a set position where the distance between the side end Sa of the sheet and the standard surface 31*a* of the standard member 31 is the ideal distance Lt is preset for the sheet position detection sensor 60. When the sheet is conveyed to the sheet position detection sensor 60, a displacement amount Lerr thereof from the zero-point position is detected, and the conveyance roller pair 34-4 is shifted by the slide mechanism 600 such that the displacement amount is cancelled. That is, the displacement amount Lerr is set as the shift amount, and the conveyance roller pair 34-4 is shifted by the set shift amount such that the distance between the side end Sa of the sheet and the standard surface 31*a* of the standard member 31 is the ideal distance Lt. To be noted, a virtual line VL indicated by a dot line in the drawing is a virtual line obtained by extending the standard surface 31*a* in the sheet conveyance direction V.

However, the distance L between the side end Sa of the sheet and the standard surface 31*a* of the standard member 31 is deviated from the ideal distance Lt by the displacement amount Ta as illustrated in FIG. 18B as a result of the standard member 31 being adjusted by the displacement amount Ta as described above. As described above, in the case where the distance L between the side end Sa of the shifted sheet and the standard surface 31*a* of the standard member 31 is changed by the displacement amount Ta, the distance in the width direction W by which the sheet is obliquely conveyed to the standard member 31 by the oblique conveyance roller pairs 32-1 to 32-3 differs from the ideal distance. In addition, the distance by which the end surface of the sheet is caused to slide after abutting the standard surface 31*a* of the standard member 31 also differs from the ideal distance. In this case, the sheet conveyance speed at the time of skew correction cannot be stabilized, and there is a possibility that stable sheet conveyance cannot be performed and thus a sheet jam or the like occurs.

In the case where the standard member 31 is displaced by the displacement amount Ta, the zero-point position set for the sheet position detection sensor 60 may be corrected as illustrated in FIG. 20. In other words, as illustrated in FIG. 20, correction may be performed such that the corrected zero-point position is a position offset by the displacement amount Ta from the standard surface 31*a* of the standard member 31 indicated by the virtual line VL. As a result of this, the distance between the side end Sa of the sheet and the standard surface 31*a* of the standard member 31 after the conveyance roller pair 34-4 is shifted by the slide mechanism 600 can be adjusted to the ideal distance Lt.

Correction Mode according to First Embodiment

Figure 21:
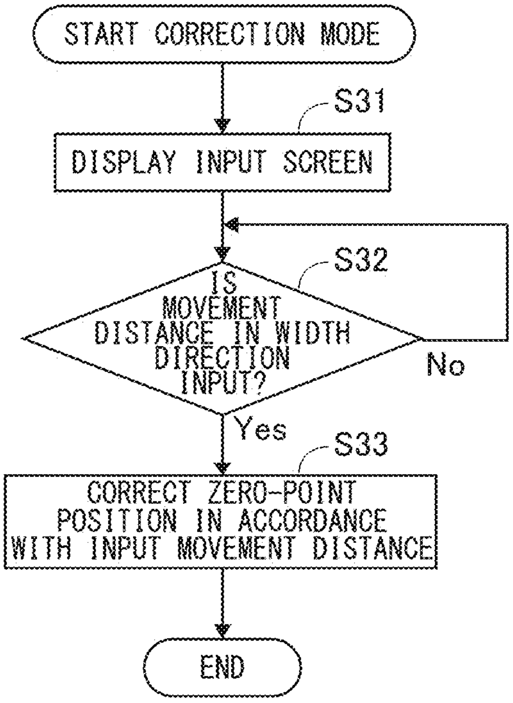
FIG. 21 is a flowchart illustrating control of a correction mode according to the first embodiment.

Next, a correction mode according to the first embodiment will be described with reference to FIG. 21. FIG. 21 is a flowchart illustrating control in the correction mode according to the first embodiment.

As described above, for example, in the case where the service worker has measured the position of the image formed on the sheet and adjusted the position in the width direction W of the standard member 31, the service worker selects to execute the correction mode via the operation portion 400 serving as an input portion, and starts the control illustrated in FIG. 21. To be noted, the control illustrated in FIG. 21 may be executed by accessing the printer 1 from an external computer via an interface 9*d* serving as an input portion instead of the operation portion 400.

When the correction mode is started, first, in step S31, the controller 9 displays an input screen that enables input of a distance by which the standard member 31 has been moved in the width direction W, that is, the displacement amount Ta described above on the display panel of the operation portion 400 or a display screen of the external computer.

Then, while the result of step S32 is No, a standby state is taken until the movement distance in the width direction W, that is, the displacement amount Ta is input, and when the movement distance in the width direction W of the standard member 31 is input by the service worker, that is, in the case where the result of step S32 is Yes, the process proceeds to step S33. Then, in step S33, the controller 9 corrects the zero-point position of the sheet position detection sensor 60 in accordance with the input movement distance in the width direction W of the standard member 31, that is, the displacement amount Ta as illustrated in FIG. 20, and the control is finished. That is, the controller 9 corrects the zero-point position on the basis of the distance (movement amount) in the width direction W by which the standard member 31 has been moved in the position adjustment.

As described above, in the present embodiment, in the case where the standard member 31 is adjusted by moving the standard member 31 in the width direction W, for example, the service worker executes the correction mode and corrects the zero-point position of the sheet position detection sensor 60. As a result of this, the distance between the side end Sa of the sheet and the standard surface 31*a* of the standard member 31 after the conveyance roller pair 34-4 is shifted can be adjusted to the ideal distance Lt. Therefore, the sheet conveyance speed during the skew correction in the skew correction portion 50B can be stabilized, the sheet conveyance can be stabilized, the possibility of occurrence of a sheet jam or the like can be reduced, and deterioration of the productivity can be suppressed.

Second Embodiment

Next, a second embodiment obtained by modifying part of the first embodiment will be described. In the first embodiment described above, a case where the position in the width direction W of the standard member 31 is adjusted in accordance with displacement in the width direction W of the image formed on the sheet has been described. In contrast, in the second embodiment, a case where the angle of the standard member 31 is adjusted in accordance with deviation of the angle of the image formed on the sheet will be described.

Figure 22A:
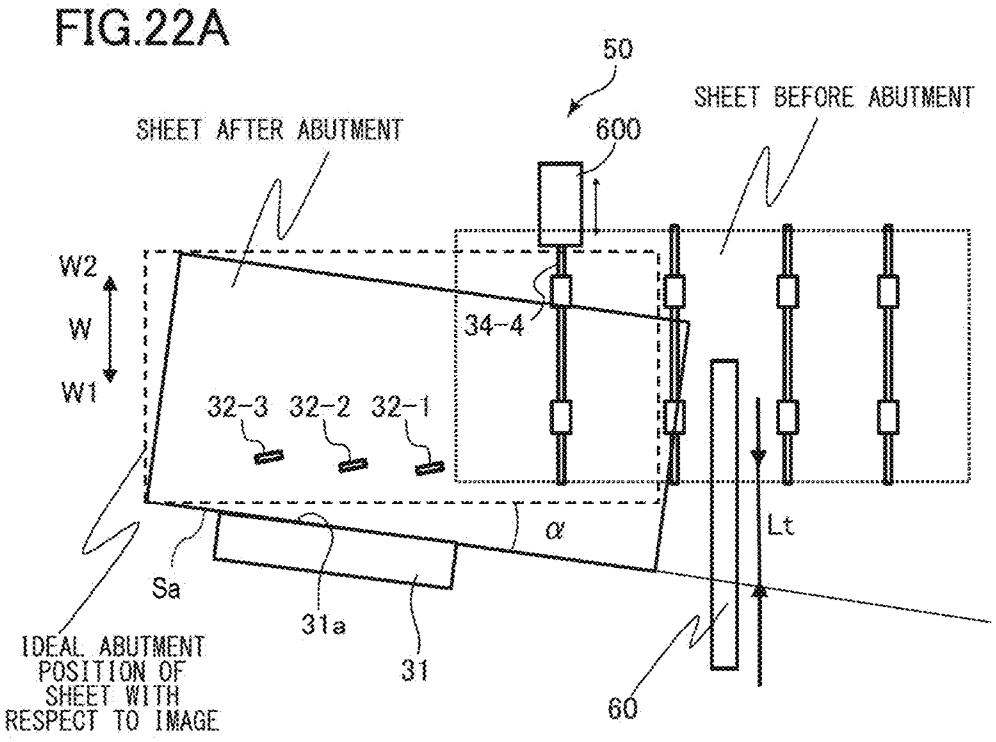
FIG. 22A is a top view illustrating the ideal sheet position with respect to the transferred image and a sheet position of the sheet abutting the standard member whose angle is not adjusted in the registration unit.
Figure 22B:
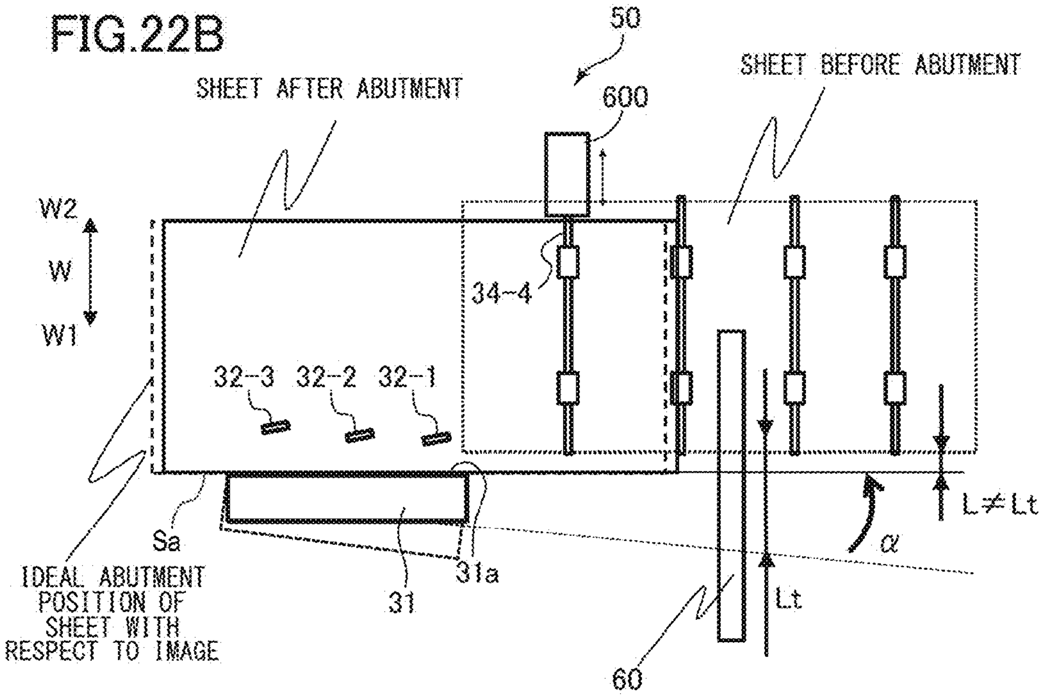
FIG. 22B is a top view illustrating the ideal sheet position with respect to the transferred image and a sheet position of the sheet abutting the standard member whose angle has been adjusted in the registration unit.
Figure 23:
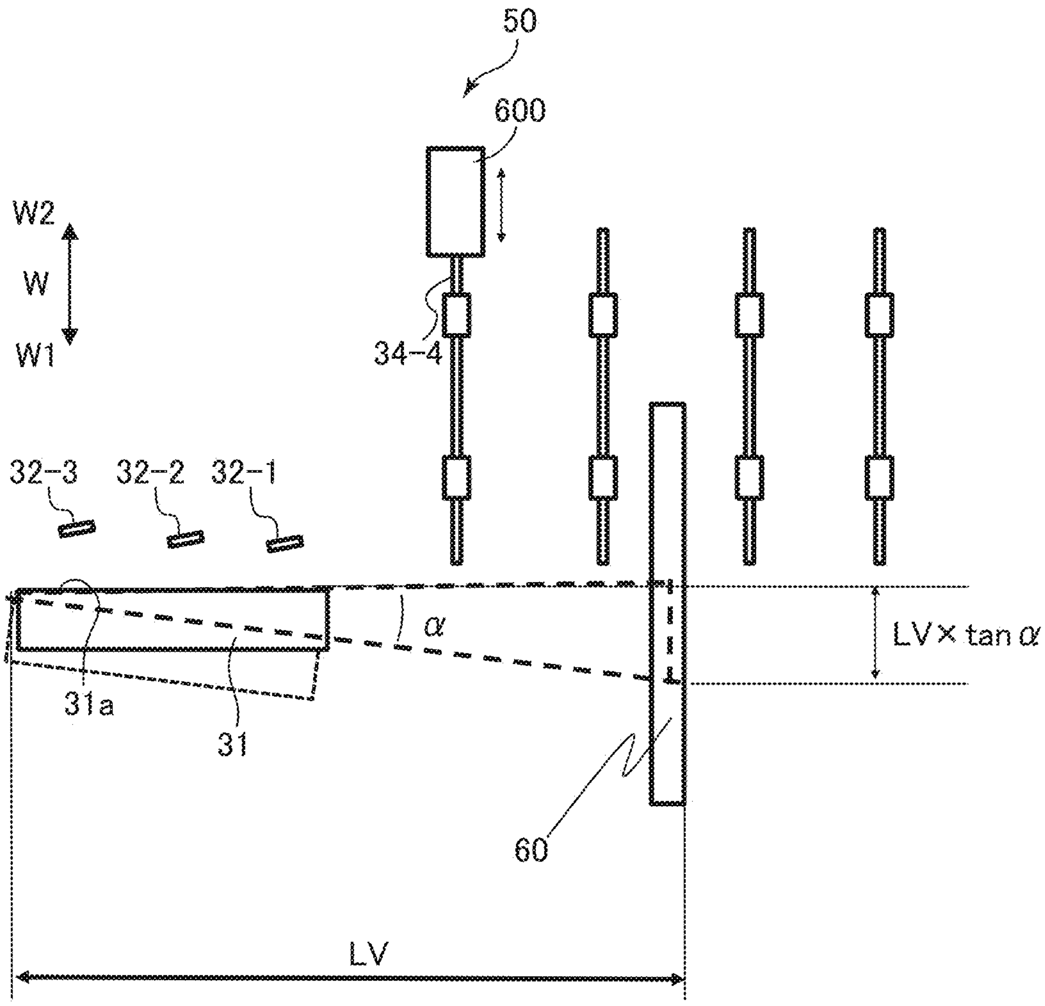
FIG. 23 is a top view illustrating the relationship between the angular change of the standard member and a correction distance in the width direction in the sheet position detection sensor.
Figure 24:
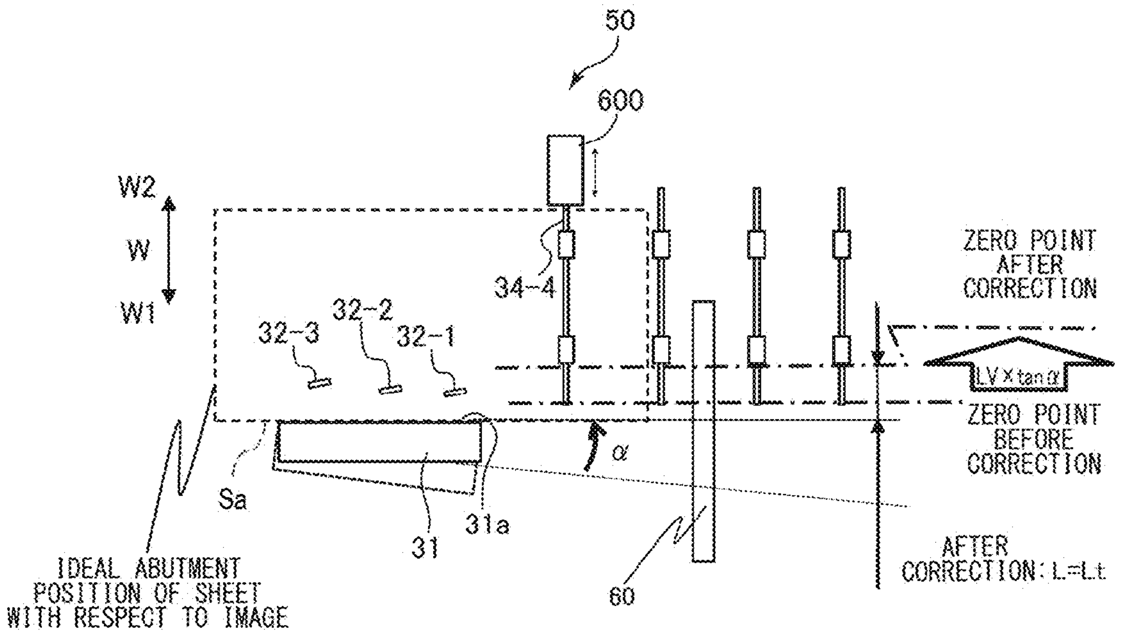
FIG. 24 is a top view illustrating a corrected zero-point position after adjustment of the angle of the standard member in the registration unit.

Adjustment of Angle of Standard Member and Deviation Resulting from Adjustment Next, adjustment of the angle of the standard member 31, deviation of the distance Lt between the side end Sa of the sheet before skew correction and the standard surface 31*a* of the standard member 31 resulting therefrom, and the correction thereof will be described with reference to FIGS. 22A to 24. FIG. 22A is a top view illustrating an ideal sheet position with respect to the transferred image and the sheet position of the sheet abutting the standard member 31 whose angle is not adjusted in the registration unit 50. FIG. 22B is a top view illustrating the ideal sheet position with respect to the transferred image and the sheet position of the sheet abutting the standard member 31 whose angle has been adjusted in the registration unit 50. FIG. 23 is a top view illustrating a relationship between the angle change of the standard member 31 and the correction distance in the width direction W in the sheet position detection sensor 60. FIG. 24 is a top view illustrating the corrected zero-point position after adjustment of the angle of the standard member 31 in the registration unit 50. To be noted, the standard member 31 according to the second embodiment is configured to be positionally adjustable (rotatable) in the rotation direction (that is, the angle) with respect to the apparatus body 1A of the printer 1.

As illustrated in FIG. 22A, a case where the angle of the standard member 31 is deviated from the ideal abutment position of the sheet by an angle $\alpha$ with respect to the position in the width direction W of the image transferred by the image formation engine 513 is assumed. In this case, the angle of the image formed on the sheet is deviated by the angle $\alpha$. Therefore, for example, the service worker measures the angle of the image formed on the sheet. Then, the service worker adjusts the angle of the standard member 31, that is, rotates the standard member 31 by the angle $\alpha$ obtained from the measured angle of the image. As a result of this, the angle of the sheet shifted by the registration roller pair 7 by the certain amount is aligned with the angle of the image transferred onto the sheet.

However, at the position where the sheet position detection sensor 60 is disposed, the distance between the side end Sa of the sheet and the standard surface 31*a* of the standard member 31 is deviated from the ideal distance Lt as illustrated in FIG. 22B as a result of the adjustment of the standard member 31 by the angle $\alpha$ as described above. The displacement amount in the width direction W at a position where the where the sheet position detection sensor 60 is disposed resulting from the adjustment by the angle $\alpha$ is a displacement amount LV×tan $\alpha$ when the distance in the conveyance direction from the pivot point of the angle adjustment of the standard member 31 to the sheet position detection sensor 60 is LV as illustrated in FIG. 23.

As described above, in the case where the distance L between the side end Sa of the shifted sheet and the standard surface 31*a* of the standard member 31 is deviated by the displacement amount LV×tan $\alpha$a, the distance in the width direction W by which the sheet is obliquely conveyed to the standard member 31 by the oblique conveyance roller pairs 32-1 to 32-3 differs from the ideal distance. In addition, the distance by which the end surface of the sheet is caused to slide after abutting the standard surface 31*a* of the standard member 31 also differs from the ideal distance. In this case, the sheet conveyance speed at the time of skew correction cannot be stabilized, and there is a possibility that stable sheet conveyance cannot be performed and thus a sheet jam or the like occurs.

In the case where the angle of the standard member 31 is deviated by the angle $\alpha$, the zero-point position set for the sheet position detection sensor 60 may be corrected as illustrated in FIG. 24. In other words, as illustrated in FIG. 24, correction may be performed such that the corrected zero-point position is a position offset by the displacement amount LV×tan $\alpha$ from the standard surface 31*a* of the standard member 31 indicated by the virtual line VL. As a result of this, the distance between the side end Sa of the sheet and the standard surface 31*a* of the standard member 31 after the conveyance roller pair 34-4 is shifted by the slide mechanism 600 can be adjusted to the ideal distance Lt.

Correction Mode According to Second Embodiment

Figure 25:
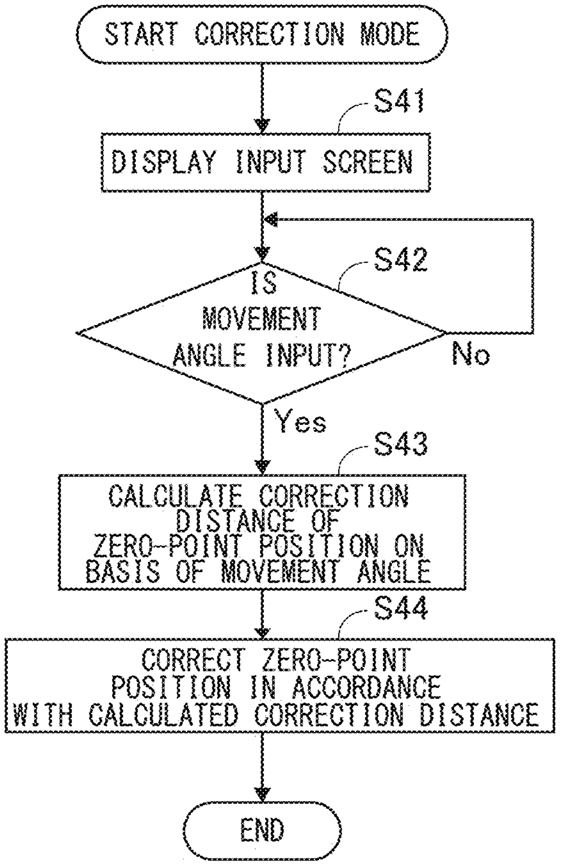
FIG. 25 is a flowchart illustrating control of a correction mode according to a second embodiment.

Next, a correction mode according to the second embodiment will be described with reference to FIG. 25. FIG. 25 is a flowchart illustrating control in the correction mode according to the second embodiment.

As described above, for example, in the case where the service worker has measured the angle of the image formed on the sheet and adjusted the angle of the standard member 31, the service worker selects to execute the correction mode via the operation portion 400 serving as an input portion, and starts the control illustrated in FIG. 25. To be noted, the control illustrated in FIG. 25 may be executed by accessing the printer 1 from an external computer via the interface 9*d* serving as an input portion instead of the operation portion 400.

When the correction mode is started, first, in step S41, the controller 9 displays an input screen that enables input of an angle by which the standard member 31 has been moved, that is, the angle α described above on the display panel of the operation portion 400 or a display screen of the external computer. Then, while the result of step S42 is No, a standby state is taken until the movement angle, that is, the angle α is input, and when the movement angle of the standard member 31 is input by the service worker, that is, in the case where the result of step S42 is Yes, the process proceeds to step S43. Then, in step S43, the controller 9 calculates, as the correction distance of the zero-point position, the displacement amount LV×tan α in the width direction W at the position where the sheet position detection sensor 60 is disposed, in accordance with the input movement angle of the standard member 31, that is, the angle α. Then, in step S44, the zero-point position is corrected in accordance with the calculated correction distance as illustrated in FIG. 24, and the control is finished. That is, the controller 9 corrects the zero-point position on the basis of the angle (movement amount) by which the standard member 31 has been moved in the position adjustment.

As described above, in the case where the angle of the standard member 31 is corrected, the correction mode is executed to correct the zero-point position of the sheet position detection sensor 60. As a result of this, the distance between the side end Sa of the sheet and the standard surface 31*a* of the standard member 31 after the conveyance roller pair 34-4 is shifted can be adjusted to the ideal distance Lt. Therefore, the sheet conveyance speed during the skew correction in the skew correction portion 50B can be stabilized, the sheet conveyance can be stabilized, the possibility of occurrence of a sheet jam or the like can be reduced, and deterioration of the productivity can be suppressed.

To be noted, in the second embodiment described above, the configurations, actions, and effects other than this are substantially the same as in the first embodiment, and therefore the description thereof will be omitted.

Other Embodiments

To be noted, in the first and second embodiments described above, a case where the adjustment is performed by moving the standard member 31 in the width direction W and a case where the adjustment is performed by changing the angle of the standard member 31 have been respectively described. However, the configuration is not limited to this, and both the correction modes may be simultaneously performed in the case where both adjustments are executed. Performing both the correction modes simultaneously may include correcting the zero-point position twice by inputting the two values of the movement distance in the width direction W and the movement angle in one time of control, or correcting the zero-point position once by using the two values in one time of control.

In addition, for example, the position of the standard member 31 may be moved in the conveyance direction, or may be three-dimensionally moved in a direction of skew. That is, the standard member 31 may be moved in any way in the position adjustment as long as the zero-point position is corrected by inputting the movement amount.

In addition, although the movement distance (displacement amount Ta) or the movement angle (angle α) serving as a movement amount of the standard member 31 is input in the display panel of the operation portion 400 in the first and second embodiments, the configuration is not limited to this. For example, the registration unit 50 may include a sensor capable of detecting the movement amount of the standard member 31, and the controller 9 may correct the zero-point position on the basis of the movement amount detected by the sensor. In addition, the controller 9 may correct the zero-point position on the basis of the position of the standard member 31 after the position adjustment instead of the movement amount of the standard member 31. In addition, the controller 9 may be configured to be capable of executing the correction mode even when the position adjustment of the standard member 31 is not performed.

In addition, although a case where the standard member 31 is moved in the width direction W has been described in the first embodiment, the structure to make the standard member 31 movable may be any structure. For example, a configuration in which the standard member 31 is fixed to the frame of the printer 1 via a screw and an elongated hole long in the width direction W, and the standard member 31 is moved in the width direction W by loosening the screw can be considered.

In addition, although a case where the standard member 31 is moved (rotated) by changing the angle thereof has been described in the second embodiment, the structure to make the angle of the standard member 31 changeable may be any structure. For example, a configuration in which the standard member 31 is fixed to the frame of the printer 1 via screws at two positions in the conveyance direction, a circular hole is provided at one of the two positions, an elongated hole is provided at the other of the two positions, and the standard member 31 can be rotated about one of the holes by loosening the screws can be considered. In addition, a case where the angle is changed about a downstream end portion of the standard member 31 in the conveyance direction when changing the angle of the standard member 31, that is, rotating the standard member 31 as illustrated in FIG. 23 has been described. However, the configuration is not limited to this, and the angle may be changed about the center or an upstream end portion of the standard member 31 in the conveyance direction. That is, the pivot point may be located at any position.

In addition, in the first and second embodiments, a case where the registration unit 50 performs the skew correction on the upstream side of the secondary transfer portion 1C has been described. However, the configuration is not limited to this, and for example, the skew correction may be performed upstream of a processing portion or the image reading portion. For example, the processing portion performs a cutting process, binding process, punching process, or folding process of the sheets.

In addition, although a case where the printer 1 is a full-color laser beam printer of an electrophotographic system has been described in the present embodiment, the configuration is not limited to this. The configuration or system of the image forming portion that forms an image on a sheet may be any configuration or system. For example, the printer may be an inkjet printer.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-140907, filed Sep. 5, 2022, which is hereby incorporated by reference herein in its entirety.

What is claimed is:

1. A sheet conveyance apparatus comprising:

a rotary member pair configured to nip and convey a sheet in a sheet conveyance direction;

a movement portion configured to move the rotary member pair in a width direction orthogonal to the sheet conveyance direction in a state where the sheet is nipped by the rotary member pair;

a detection portion configured to detect a position of a side-edge of the sheet;

an abutment member disposed downstream of the rotary member pair in the sheet conveyance direction and configured to be positionally movable in the width direction, the abutment member including an abutment surface configured to extend along the sheet conveyance direction;

an oblique conveyance portion disposed downstream of the rotary member pair in the sheet conveyance direction and configured to convey the sheet obliquely in a direction inclined with respect to the sheet conveyance direction such that the sheet approaches the abutment surface in the width direction; and a controller configured to, on a basis of a detection result of the detection portion, control the movement portion to move the rotary member pair in the width direction before the sheet reaches the oblique conveyance portion such that a position, of the side edge of the sheet in the width direction, is spaced from the abutment surface by a predetermined distance in the width direction, wherein the controller is configured to correct the detection portion such that, when a position of the abutment member is moved in the width direction, the movement portion moves the rotary member pair to move the sheet so as to be spaced from the abutment surface of the abutment member which has been moved in the width direction by the predetermined distance in the width direction.

2. The sheet conveyance apparatus according to claim 1, wherein the detection portion has a set position which corresponds to a position, of the side edge of the sheet which has been moved by the movement portion in the width direction, spaced from the abutment surface of the abutment member by the predetermined distance in the width direction; and wherein the controller is configured to correct the set position in the detection portion when a position of the abutment member is moved in the width direction.

3. The sheet conveyance apparatus according to claim 2, wherein the controller corrects the set position on a basis of a movement amount by which the abutment member has been moved in the width direction.

4. The sheet conveyance apparatus according to claim 3, further comprising an input portion configured to input the movement amount.

5. The sheet conveyance apparatus according to claim 1, wherein:

the rotary member pair is a first rotary member pair, the detection portion is a first detection portion, the movement portion is a first movement portion, the sheet conveyance apparatus further comprises:

a second rotary member pair configured to nip and convey the sheet having been caused to abut the abutment surface by the oblique conveyance portion;

a second movement portion configured to move the second rotary member pair in the width direction; and a second detection portion configured to detect the sheet having reached the second rotary member pair, and after the sheet having reached the second rotary member pair is detected by the second detection portion, the controller moves the second rotary member pair, nipping the sheet, by the second movement portion such that a position of the sheet matches a position, in the width direction, of an image formed on the sheet by an image forming portion.

6. The sheet conveyance apparatus according to claim 5, wherein:

the oblique conveyance portion is switchable between a nip-conveyance state where the oblique conveyance portion nips and conveys the sheet, and a non-nipping state where the oblique conveyance portion releases a nipping of the sheet, and the controller switches the oblique conveyance portion to the non-nipping state in a state where the second rotary member pair moves the sheet in the width direction.

7. The sheet conveyance apparatus according to claim 1, wherein:

the rotary member pair is switchable between a nip-conveyance state where the rotary member pair nips and conveys the sheet, and a non-nipping state where the rotary member pair releases a nipping of the sheet, and the controller switches the rotary member pair to the non-nipping state in a state where the oblique conveyance portion obliquely conveys the sheet.

8. An image forming apparatus comprising:

a sheet conveyance apparatus according to claim 1; and an image forming portion configured to form an image on a sheet conveyed by the sheet conveyance apparatus.

9. The image forming apparatus according to claim 8, wherein the controller is configured to correct the detection portion such that, when a position of the abutment member is moved in the width direction in accordance with the position of the image, the movement portion moves the rotary member pair to move the sheet so as to be spaced from the abutment surface of the abutment member which has been moved in the width direction by the predetermined distance in the width direction.

* * * * *